US012653298B1

(12) United States Patent
Shah et al.

(10) Patent No.: US 12,653,298 B1
(45) Date of Patent: Jun. 16, 2026

(54) DERMATOLOGIC LUBRICANT DISPENSER AND BUFFING APPLICATOR

(71) Applicant: Sasy Scientifics LLC, Clarksville, MD (US)

(72) Inventors: Syed Saleem Shah, Clarksville, MD (US); Saif Uddin Syed, Lutherville, MD (US)

(73) Assignee: Sasy Scientifics LLC, Clarksville, MD (US)

( * ) Notice: Subject to any disclaimer, the term of this patent is extended or adjusted under 35 U.S.C. 154(b) by 0 days.

(21) Appl. No.: 19/190,728

(22) Filed: Apr. 27, 2025

Related U.S. Application Data

(63) Continuation of application No. 18/376,415, filed on Oct. 3, 2023, now Pat. No. 12,310,483, which is a continuation of application No. 17/584,367, filed on Jan. 25, 2022, now Pat. No. 11,805,883.

(60) Provisional application No. 63/141,732, filed on Jan. 26, 2021.

(51) Int. Cl.
*A45D 40/26* (2006.01)
*A61H 7/00* (2006.01)

(52) U.S. Cl.
CPC ........ *A45D 40/26* (2013.01); *A45D 2200/054* (2013.01); *A61H 7/004* (2013.01); *A61H 7/005* (2013.01)

(58) Field of Classification Search
CPC .. A45D 40/26; A45D 2200/054; A61H 7/004; A61H 2201/5007; A61H 7/007; A61H 23/006; A61H 15/0078; A61H 15/0085; A61H 15/0092
USPC ................................ 401/171, 261, 263, 265
See application file for complete search history.

(56) References Cited

U.S. PATENT DOCUMENTS

| | | | |
|---|---|---|---|
| 3,968,789 | A | 7/1976 | Simoncini |
| 5,961,235 | A | 10/1999 | Kennedy |
| 6,170,108 | B1 | 1/2001 | Knight |
| 8,128,638 | B2 | 3/2012 | Karasiuk et al. |
| 8,777,507 | B1 | 7/2014 | Carey |
| 9,339,104 | B2 | 5/2016 | O'Neill |
| 9,386,837 | B2 | 7/2016 | Geva et al. |
| 9,462,873 | B2 | 10/2016 | Casasanta, III |

(Continued)

FOREIGN PATENT DOCUMENTS

| | | | |
|---|---|---|---|
| EP | 2649977 | B1 | 12/2015 |
| KR | 20140001411 | U | 3/2014 |

(Continued)

*Primary Examiner* — David J Walczak
(74) *Attorney, Agent, or Firm* — Rahman LLC

(57) ABSTRACT

A hand-held device includes a handle and a housing operatively connected to the handle. The housing includes a first portion and a second portion. A cartridge is inside the second portion of the housing. The cartridge is adapted to contain a bio-safe lubricant. An applicator head having a smooth surface is attached to the first portion of the housing. A nozzle is operatively connected to the cartridge and extends through the applicator head. The nozzle discharges the lubricant out from the applicator head. A rod is in the cartridge. A plate is connected to the rod and positioned in the cartridge. A first motor is in the first portion and drives motion of the applicator head. A second motor is operatively connected to the rod. The second motor drives motion of the rod in the cartridge. The rod drives motion of the plate in the cartridge.

21 Claims, 21 Drawing Sheets

(56) References Cited

U.S. PATENT DOCUMENTS

| | | | |
|---|---|---|---|
| 9,730,758 B2 | 8/2017 | Carlucci | |
| 9,814,295 B2 | 11/2017 | Chiasson | |
| 10,058,351 B2 | 8/2018 | Hendler et al. | |
| 10,517,704 B2 | 12/2019 | Carlyle et al. | |
| 11,191,696 B2 | 12/2021 | Aragon | |
| 2006/0285910 A1 | 12/2006 | Khubani | |
| 2008/0146977 A1 | 6/2008 | Hilditch | |
| 2008/0167590 A1 | 7/2008 | Jon et al. | |
| 2021/0154093 A1 | 5/2021 | Boone, III et al. | |
| 2022/0378652 A1* | 12/2022 | Ju | A61H 7/004 |
| 2023/0080370 A1* | 3/2023 | Katz | A61H 23/0254 601/101 |

FOREIGN PATENT DOCUMENTS

| | | |
|---|---|---|
| WO | 2013018968 A1 | 2/2013 |
| WO | 2015174844 A2 | 11/2015 |

* cited by examiner

DERMATOLOGIC LUBRICANT DISPENSER AND BUFFING APPLICATOR

CROSS-REFERENCE TO RELATED APPLICATIONS

This application is a continuation of U.S. patent application Ser. No. 18/376,415 filed on Oct. 3, 2023, which is a continuation of U.S. patent application Ser. No. 17/584,367 filed on Jan. 25, 2022, which claims the benefit of U.S. Provisional Patent Application No. 63/141,732 filed on Jan. 26, 2021, the complete disclosures of which, in their entireties, are herein incorporated by reference.

BACKGROUND

Technical Field

The embodiments herein generally relate to devices used to apply dermatologic and other topical creams on a user, and more particularly to a dermatologic cream dispenser and applicator that provides a measured dispensing and application of a topical cream.

Description of the Related Art

Traditionally, users apply dermatologic creams including prescription creams to their skin using their hands. This approach can result in uneven application of the therapeutic cream or under/over application scenarios whereby too much cream or too little cream is applied, or the duration of the application is not aligned with a doctor's prescribed instruction. All of these drawbacks limit the effectiveness of the cream and may simply result in a lack of effectiveness in overcoming the particular skin malady and worse may further agitate the user's skin. Handheld lubricant dispensers for dermatologic application are known in the industry. Examples of various types of lubricant dispenser devices include European Patent No. EP2649977; South Korean Patent Publication No. 20140001411; World Intellectual Property Organization (WIPO) Patent Application No. WO2013/018968; WIPO Patent Application No. WO2015/174844; U.S. Pat. Nos. 3,968,789; 5,961,235; 6,170,108; 8,128,638; 8,777,507; 9,339,104; 9,386,837; 9,462,873; 9,730,758; 10,517,704; U.S. Patent Publication No. 2008/0146977; and U.S. Patent Publication No. 2008/0167590.

Some of the drawbacks and limitations of the conventional solutions are that the dispensing of the lubricants can be uneven resulting in an uneven application to a user's skin. As with a direct application by hand, this can also limit the therapeutic effects as one area of skin may receive more/less cream than other areas. For example, a user may have psoriasis on his/her skin requiring a precise application of therapeutic cream with specific topical formulations in order to cure the malady. Generally, an evenly distributed application of cream is more effective to cure most skin maladies such as psoriasis. However, application by hand and use of conventional devices that do not provide a measured dispensing and application of the cream or do not permit dispensing of specified pharmacologic creams will do little to cure such maladies. Accordingly, there remains a need for a new type of lubricant dispensing buffing device that can provide an even and measured distribution of lubricants and creams to a user's skin.

SUMMARY

In view of the foregoing, the embodiments herein provide a hand-held device comprising a handle; a housing operatively connected to the handle, wherein the housing comprises a first portion and a second portion; a cartridge positioned inside the second portion of the housing, wherein the cartridge is adapted to contain a bio-safe lubricant; an applicator head attached to the first portion of the housing, wherein the applicator head comprises a smooth surface; a nozzle operatively connected to the cartridge and extending through the applicator head, wherein the nozzle is to discharge the lubricant out from the applicator head; a rod in the cartridge; a plate connected to the rod and positioned in the cartridge; a first motor in the first portion of the housing, wherein the first motor is to drive motion of the applicator head; and a second motor operatively connected to the rod, wherein the second motor is to drive motion of the rod in the cartridge, and wherein the rod is to drive motion of the plate in the cartridge.

The handle may be pivotally connected to the housing. The device may comprise a wall in the housing that separates the first portion from the second portion. The rod may comprise threads that engage complementary threads of the plate. The device may comprise a collar surrounding the nozzle in the first portion of the housing or in the applicator head or a combination thereof; a first gear operatively connected to the collar; and a first pinion operatively connecting the first motor to the first gear. The first motor may drive motion of the first pinion. The motion of the first pinion may drive motion of the collar. The collar may drive motion of the applicator head. The motion of the applicator head may comprise any of a swivel motion, rotation motion, vibration motion, or a combination thereof.

The device may comprise a second gear operatively connected to the rod; and a second pinion operatively connecting the second motor to the second gear. The second motor may drive motion of the second pinion. The motion of the second pinion may drive motion of the second gear. The second gear may rotate the rod. The rotation of the rod may translate the plate within the cartridge. The translation of the plate pushes the lubricant in the cartridge and in the nozzle.

The cartridge may be removably detachable from the housing. The plate may comprise a substantially disk configuration. The plate may comprise an angled configuration. The device may comprise a power source in the handle; and an electronic circuit board in the handle and electrically connected to the power source, the first motor, and the second motor. The first motor may be adjacent to a first lateral side of the collar in the first portion of the housing. The second motor may be adjacent to a second lateral side of the collar in the first portion of the housing. The first lateral side and the second lateral side may be on opposite sides of the nozzle. The first motor may be longitudinally aligned with the nozzle in the first portion of the housing. The rod may be positioned offset to a central longitudinal axis of the cartridge. The rod may be positioned along a central longitudinal axis of the cartridge. The housing may comprise a third portion adjacent to the second portion. The second motor may be positioned in any of the first portion, the second portion, and the third portion of the housing. The third portion may be pivotally connected to the second portion. The device may comprise a gap between the cartridge and an inner wall of the second portion of the housing.

These and other aspects of the embodiments herein will be better appreciated and understood when considered in conjunction with the following description and the accompanying drawings. It should be understood, however, that the following descriptions, while indicating exemplary embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF DRAWINGS

The embodiments herein may be better understood from the following detailed description with reference to the drawings, in which.

DETAILED DESCRIPTION

Figure 1B:
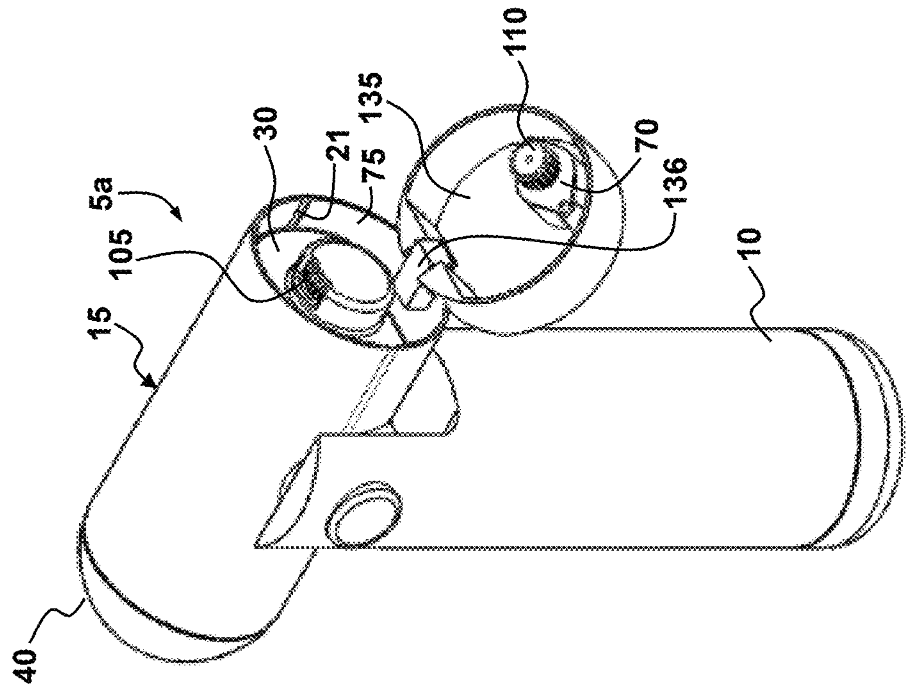
FIG. 1(B) is a rear perspective view illustrating the lubricant dispensing buffing device of FIG. 1(A), according to a first embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, generally, an evenly distributed application of cream is more effective to cure most skin maladies such as psoriasis. However, application by hand and use of conventional devices that do not provide a measured dispensing and application of the cream or do not permit dispensing of specified pharmacologic creams will do little to cure such maladies. In addition, efficacy of topical treatments can significantly improve if regular pressure and friction are applied along with the topical product. A device that significantly reduces effort to apply rotational and oscillating pressure with a topical formulation will yield faster clinical and aesthetic improvements with more effective use of product. The embodiments herein provide a lubricant dispensing buffing device that discharges a lubricant (e.g., medicinal ointments, creams, oils, etc.) and can be applied to a user's body/skin to alleviate discomfort, such as caused by rashes, etc. The buffing device may also be used to remove make-up. The buffing action may involve a rotating head or a buffing pad that is smooth in conjunction with the lubricant. The device may be tailored to apply generic, specific, and proprietary products allowing the user to be communicatively connected and engaged to their physician, advisor, and/or community including other users of the device.

Various terms are used herein. To the extent a term used in a claim is not defined below, it should be given the broadest definition persons in the pertinent art have given that term as reflected in printed publications and issued patents at the time of filing.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all groups used in the appended claims.

In the specification, reference may be made to the spatial relationships between various components and to the spatial orientation of various aspects of components as the devices are depicted in the attached drawings. However, as will be recognized by those skilled in the art after a complete reading of the present application, the devices, members, devices, etc. described herein may be positioned in any desired orientation. Thus, the use of terms such as "above," "below," "upper," "lower," "first", "second" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. Referring now to the drawings, and more particularly to FIGS. 1(A) through 7, where similar reference characters denote corresponding features consistently throughout the figures, there are shown example embodiments. In the drawings, the size and relative sizes of components, layers, and regions, etc. may be exaggerated and/or removed for clarity.

Figure 1A:
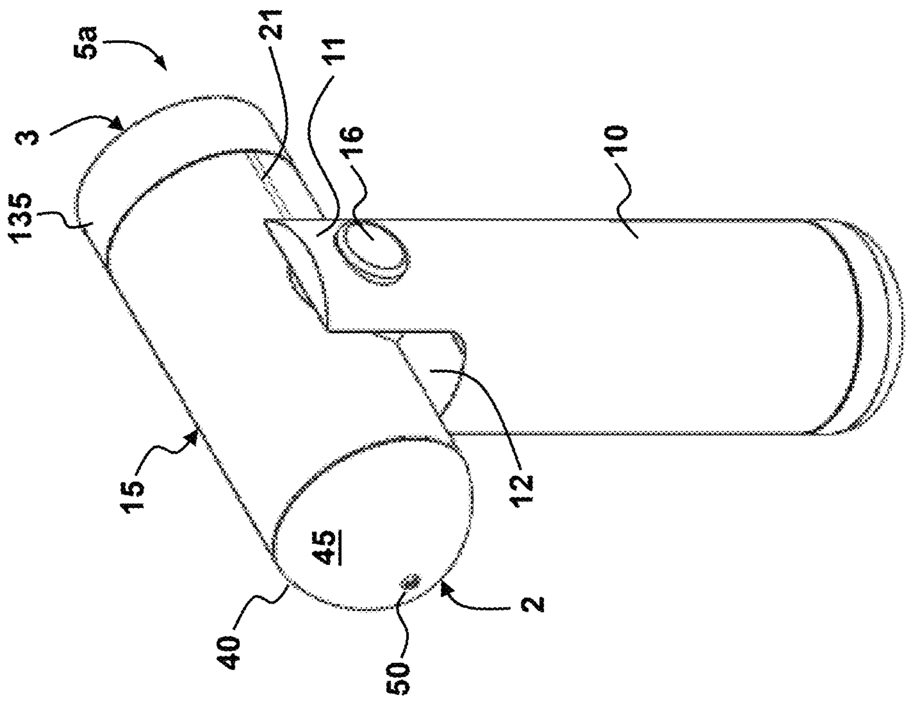
FIG. 1(A) is a front perspective view illustrating a lubricant dispensing buffing device, according to a first embodiment herein.

FIGS. 1(A) through 1(J) illustrate a hand-held lubricant dispensing buffing device 5*a*, according to a first embodiment herein. As shown in FIG. 1(A), the device 5*a* comprises a front end 2 and a rear end 3. The device 5*a* comprises a handle 10. The handle 10 may house various components such as microelectronics, batteries, as well as connecting mechanisms, among other components, as further described below. The handle 10 may be substantially elongated and dimensioned and configured to have a contoured shape to be easily held by a user. The handle 10 may comprise a LCD or LED illuminated display screen 18. For ease of view, the display screen 18 is only shown on the device 5*a* in FIG. 1(J). However, it is to be understood that the display screen 18 may be part of the handle 10 as provided in all of the other corresponding figures illustrating device 5*a*. Moreover, additional user buttons 19 may be configured on the display screen 18 as touch-enabled graphic user interface (GUI) buttons and/or the user buttons 19 may be positioned on the handle 10 itself as toggle or press-enabled buttons or a combination thereof. The display screen 18 and user buttons 19 may be positioned anywhere on the handle 10. The handle 10 may be configured to fit on a docking station or receptacle 150 (shown in FIG. 6), which may engage the device 5*a* at or near the base or bottom of the handle 10. The docking station or receptacle 150 may be utilized as a stand for the device 5*a* and/or power source, adapter, or charger for the device 5*a*, among other uses.

The device 5*a* further comprises a housing 15 operatively connected to the handle 10. In an example, the handle 10 may be pivotally connected to the housing 15. More specifically, the handle 10 may pivotally or rotationally attach to the housing 15 through a rotational member 16 such as a pin, dowel, screw, or any other suitable rotational member. In another example, the handle 10 and the housing 15 may detachably connect to each other. In an example, the rotational member 16 may permit the housing 15 to lock to the handle 10 and upon rotation of the housing 15 with respect to the handle 10, the rotational member 16 may comprise a series of locking positions to permit the housing 15 to be locked in various angular positions with respect to the handle 10. The housing 15 may comprise a substantially elongated configuration having a substantially cylindrical shape, although other shapes and configurations are possible in accordance with the embodiments herein.

Figure 1D:
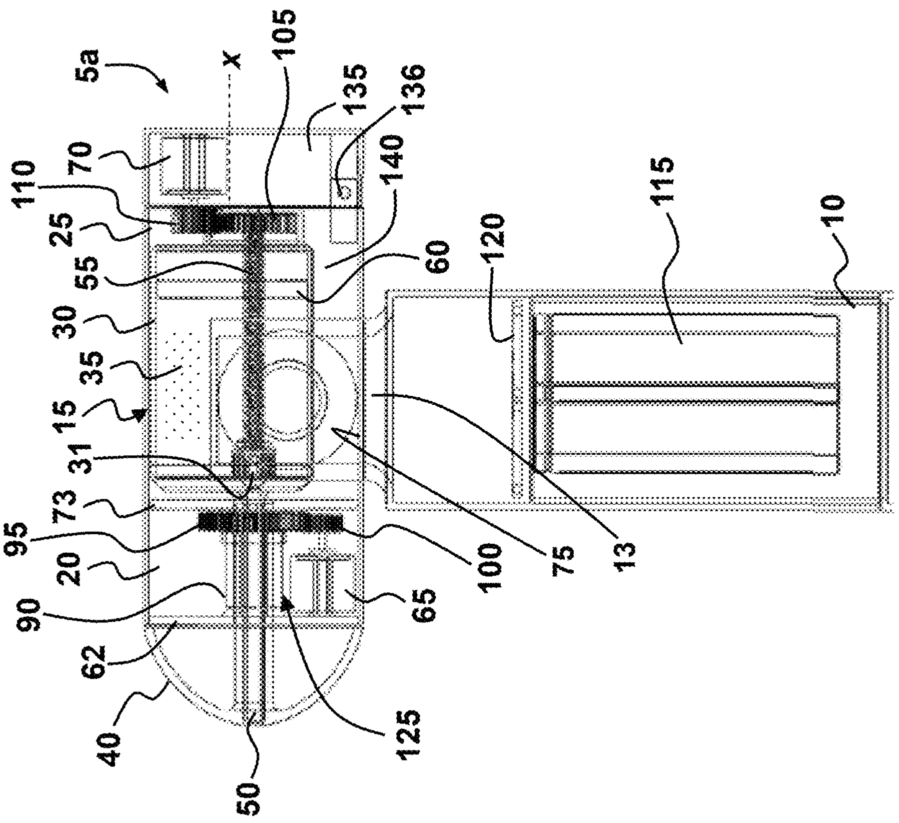
FIG. 1(D) is a second cross-sectional view illustrating the lubricant dispensing buffing device of FIG. 1(A), according to a first embodiment herein.

The handle 10 may comprise one or more upper arms 11 with a recessed seat 12 positioned adjacent to the one or more upper arms 11. In an example with a pair of arms 11, the rotational member 16 may be positioned in each upper arm 11 such that there may be a separate rotational member 16 for each arm 11 for connection to the housing 15. In an example with a pair of arms 11, the spacing between the upper arms 11 defines the width of the recessed seat 12 and is configured to accommodate the width of the housing 15. A gap 13 as further identified in FIG. 1(D) is provided between the seat 12 and the housing 15 to permit the housing 15 to have clearance for rotation about the rotational member 16 with respect to the handle 10.

Figure 1C:
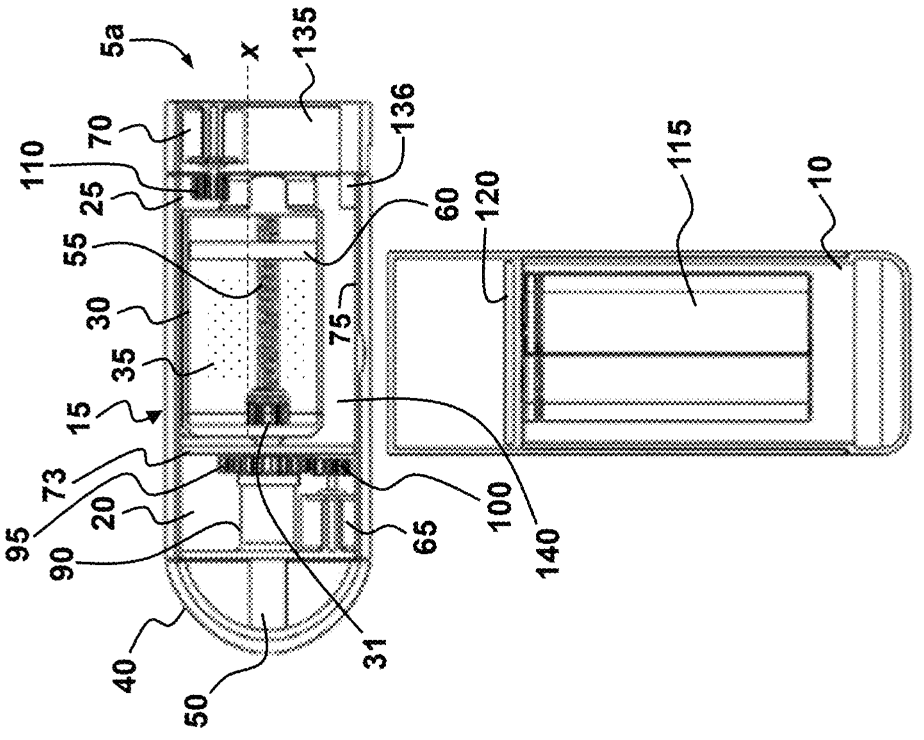
FIG. 1(C) is a first cross-sectional view illustrating the lubricant dispensing buffing device of FIG. 1(A), according to a first embodiment herein.

The housing 15 comprises a first portion 20 and a second portion 25. The first portion 20 and the second portion 25 may be connected together such that the housing 15 contains both the first portion 20 and the second portion 25. The device 5*a* may comprise a front wall 62 on the first portion 20 of the housing 15. Moreover, the device 5*a* may comprise a wall 73 in the housing 15 that separates the first portion 20 from the second portion 25 as shown in FIGS. 1(C), 1(D), and 1(E). The first portion 20 and the second portion 25 may be defined as internal chambers of the housing 15 to house additional components, as further described below. The second portion 25 is configured to be larger in size than the first portion 20, although the embodiments herein may include examples where the first portion 20 and the second portion 25 comprise a substantially similar size as each other. In an example where the housing 15 comprises a substantially cylindrical shape, the respective diameters of the first portion 20 and the second portion 25 are the same or are substantially the same. In an example, the handle 10 is configured to attach to the housing 15 adjacent to the second portion 25, although other examples permit the attachment of the handle 10 to the housing 15 to occur at the first portion 20. In an unpivoted arrangement, the handle 10 and housing 15 may form a substantially "T" shape such that the handle 10 and housing 15 are transversely positioned with respect to each other, although other shapes are possible, and the embodiments herein are not restricted to a particular shape and/or configuration. According to the first embodiment of the device 5*a* shown in FIGS. 1(A) through 1(J), the handle 10 and the housing 15 may comprise substantially equal lengths. The housing 15 may further comprise one or more tracks 21 that may be positioned internal and external to the housing 15 and on the second portion 25 as identified in FIGS. 1(A) and 1(B). The one or more tracks 21 may be configured as rails, grooves, or any other type of suitable track structures.

The device 5*a* further comprises a cartridge 30 positioned inside the second portion 25 of the housing 15. As such, the cartridge 30 is adapted to fit in the second portion 25 of the housing 15 and is configured to be smaller in length, width, and height compared to the second portion 25 of the housing 15. In an example, the cartridge 30 may comprise a substantially elongated tube configuration with a flat side 17 facing the handle 10 as indicated in FIG. 1(E). In an example, the cartridge 30 may comprise one or more guides 22 configured along the outside of the cartridge 30 to engage the one or more tracks 21 of the housing 15 as indicated in FIG. 1(I). In an example, the guides 22 may comprise a protrusion on the outside of the cartridge 30 and the tracks 21 may comprise an indent to accommodate the guides 22. In another example, the tracks 21 may comprise a protrusion on, at least the inside wall 75 of the housing 15 as shown in FIGS. 1(B) and 1(H), and the guides 22 may comprise an indent to accommodate the tracks 21. According to an example, the guides 22 may slidably engage the tracks 21. Engagement of the guides 22 with the tracks 21 allows for proper seating of the cartridge 30 in the housing 15 and to reduce vibration and movement of the cartridge 30 in the housing 15. The device 5*a* may comprise a gap 140 between the cartridge 30 and the inner wall 75 of the second portion 25 of the housing 15 as further shown in FIGS. 1(C) and 1(D). In some examples, the gap 140 may be a hollow space or may be filled with insulative material or may be used to accommodate electronic components and/or wiring.

In the device 5*a*, the cartridge 30 is adapted to contain a bio-safe lubricant 35. The lubricant 35 may be a drug in the form of a cream, gel, or other fluid of suitable viscosity and may be loaded into the cartridge 30 using a syringe or other inserter mechanism. In an example, the cartridge 30 may be reusable such that the lubricant 35 may be reloaded therein as-needed. In another example, the cartridge 30 may be disposable once the lubricant 35 is exhausted from therein. Moreover, the lubricant 35 is adapted to fill the cartridge 30 and may or may not be pressurized. Additionally, the lubricant 35 may comprise any type of lubricant that may be used for dermatological and/or other medical uses as well as non-medical uses. In an example, to ensure a lack of contamination, the cartridge 30 is configured to be sealed to prevent the lubricant 35 from escaping therefrom except from a suitable egress port 31. According to an example, the egress port 31, as identified in FIG. 1(C), may be configured to actuate between an opened position (to allow the lubricant to dispense from the cartridge 30) and closed position (to retain the lubricant 35 in the cartridge 30).

The device 5*a* further comprises an applicator head 40 attached to the front wall 62 of the first portion 20 of the housing 15 such that the applicator head 40 is aligned with the housing 15 and positioned at the tip (e.g., the front end 2 that is adjacent to the first portion 20 and away from the second portion 25) of the housing 15. In an example, the applicator head 40 comprises a smooth surface 45 devoid of abrasive particles and bristles. The head 40 may be substantially bulbous in shape although other shapes and configurations are possible. As such, the head 40 may be contoured to any suitable shape which provides comfort and ease when pressed and rotated against a user's skin. The head 40 may be made of plastic, rubber, silicone, a composite, or glass, or a combination thereof. Moreover, the head 40 may be detachably connected to the front wall 62 of the first portion of the housing 15 to facilitate changing between different heads and/or ease of cleaning or disinfection of the head 40, as necessary.

The device 5*a* further comprises a nozzle 50 operatively connected and aligned to the egress port 31 of the cartridge 30 and extending through the applicator head 40. The nozzle 50 is to discharge the lubricant 35 out from the applicator head 40. There may be a radio-frequency identification (RFID) component (e.g., one or more sensors 44 . . . 44*x* (of FIG. 6)) inside the nozzle 50 which may indicate how much lubricant 35 to dispense per instance that a button (e.g., buttons 19) on the handle 10 of the device 5*a* is pushed. Furthermore, the nozzle 50 may be configured in different sizes such that a larger sized nozzle 50 may discharge a greater amount of lubricant 35 compared with a smaller sized nozzle 50.

The head 40 of device 5*a* may be configured in a narrow, small, moderate, or large configuration, among other sizes and configurations. In an example, the narrow configuration may comprise an approximately 12 mm circumference of the head 40 with an opening of the nozzle 50 of approximately 3 mm. In an example, the small configuration may comprise an approximately 18 mm circumference of the head 40 with an opening of the nozzle 50 of approximately 4-5 mm. In an example, the moderate configuration may comprise an approximately 26 mm circumference of the head 40 with an opening of the nozzle 50 of approximately 5-6 mm. In an example, the large configuration may comprise an approximately 36 mm circumference of the head 40 with an opening of the nozzle 50 of approximately 6+ mm. The above dimensions are merely examples, and the embodiments herein are not restricted to these particular dimensions and configurations. The narrow configuration may correspond with a relatively slow rate of discharge of the lubricant 35 from the nozzle 50. The small configuration may correspond with a relatively mild rate of discharge of the lubricant 35 from the nozzle 50. The moderate configuration may correspond with a relatively moderate rate of discharge of the lubricant 35 from the nozzle 50. The large configuration may correspond with a relatively heavy rate of discharge of the lubricant 35 from the nozzle 50.

The device **5*a* further comprises a rod 55 in the cartridge 30. The rod 55 may comprise an elongated longitudinal member and may be configured as a shaft, screw, or any other advancement mechanism. The rod 55 may comprise a length that is substantially the same or similar to the length of the cartridge 30 as the rod 55 extends from one end of the cartridge 30 to the longitudinally opposing end thereof. The rod 55 may be held in place by any suitable retaining mechanism such as pins, screws, nails, brackets, adhesives, or may be engaged to another structural component in or on the cartridge 30 to retain the rod 55** in place without slipping or become dislodged or disengaged.

Figure 5:
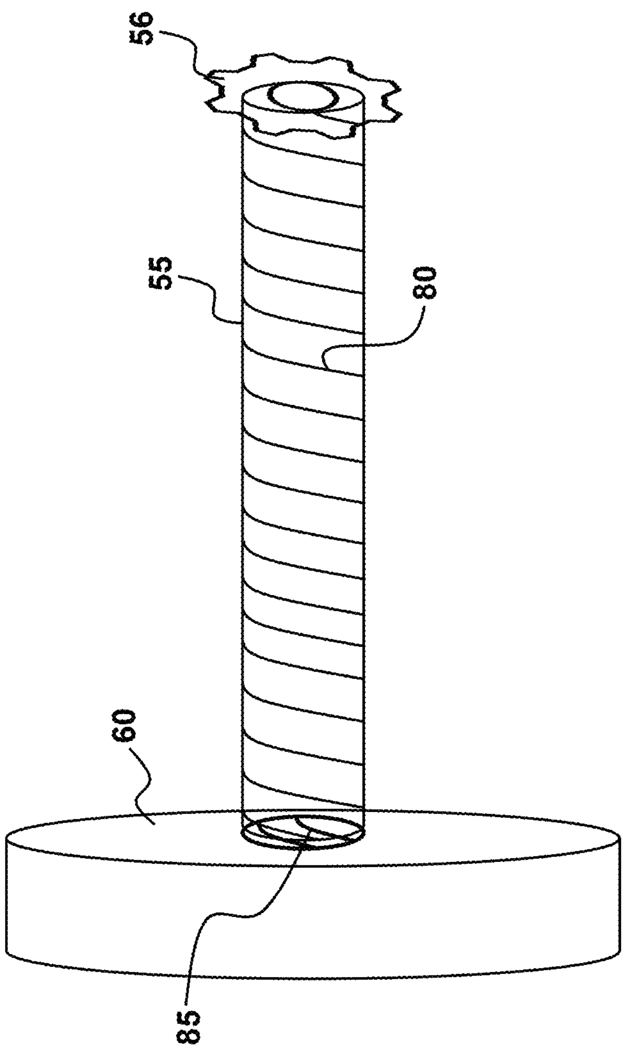
FIG. 5 is a perspective view illustrating engagement of the rod and plate of the lubricant dispensing buffing devices of FIGS. 1(A), 2(A), 3(A), and 4(A), according to an embodiment herein.

The device **5*a* further comprises a plate 60 connected to the rod 55 and positioned in the cartridge 30. The plate 60 may comprise any of a substantially disk configuration, angled configuration, symmetrical configuration, and eccentric configuration, etc., according to various examples. In an example, the plate 60 may be configured as a plunger or piston. As shown in FIG. 5, the rod 55 may comprise threads 80 that engage complementary threads 85 of the plate 60, according to an example to permit the rod 55 to rotationally actuate the plate 60. In use, the lubricant 35 is loaded or pre-loaded into the cartridge 30 and rotation of the rod 55 causes translation of the plate 60 in a direction towards the egress port 31 of the cartridge 30 (e.g., from the second portion 25 towards the first portion 20 of the housing 15), which causes the lubricant 35 to be transferred from the cartridge 30 through the egress port 31. The nozzle 50 may extend and align/attach to the egress port 31 to permit the lubricant 35 to move to the nozzle 50. The interface of the egress port 31 and nozzle 50 may be suitably sealed to prevent the lubricant 35 from escaping into the first portion 20 of the housing 15 and causing leakage as well as preventing contamination of other components of the device 5*a*. Movement of the lubricant 35 through the nozzle 50 continues out through the opening or hole of the nozzle 50 where the nozzle 50 terminates at the head 40 for application of the lubricant 35** onto a user's skin, etc.

The device **5*a* further comprises a first motor 65 in the first portion 20 of the housing 15. According to an example, the first motor 65 may be attached to the front wall 62 of the first portion 20 of the housing 15. The first motor 65 is to drive motion of the applicator head 40. In some examples, the motion of the applicator head 40 may comprise any of a swivel motion, rotation motion, vibration motion, or a combination thereof. In an example, the head 40 may move, rotate, etc. in variable speeds and at variable revolution angles according to a user's command as input through the buttons 19 or through other input mechanisms including voice command. Additionally, the first motor 65 may be a stepper motor, according to an example, and may be a variable speed motor offering both clockwise and counter-clockwise revolution motion and may also have vibrational effects. The first motor 65** may be waterproofed using a suitable sealing mechanism and/or structure.

The device **5*a* further comprises a second motor 70 operatively connected to the rod 55. In an example, the second motor 70 is to drive motion of the rod 55 in the cartridge 30. Moreover, the rod 55 is to drive motion of the plate 60 in the cartridge 30. The second motor 70 is to drive motion of the actuation of dispensing of the lubricant 35 in the cartridge 30. Additionally, the second motor 70 may be a stepper motor, according to an example, and may be a variable speed motor offering both clockwise and counter-clockwise revolution motion and may also have vibrational effects. The second motor 70** may be waterproofed using a suitable sealer, sealing mechanism and/or structure.

The device **5*a* may comprise a collar 90 surrounding the nozzle 50 in the first portion 20 of the housing 15 or in the applicator head 40 or a combination thereof. The collar 90 may be an elongated structure such as a tube that contains the nozzle 50. Moreover, the collar 90 may be fixably attached to the front wall 62 and may be longitudinally aligned with the egress port 31 of the cartridge 30. The device 5*a* further comprises a first gear 95 operatively connected to the collar 90, and a first pinion 100 operatively connecting the first motor 65 to the first gear 95. The first gear 95 may be any suitably sized gear containing any suitable number of teeth. Moreover, the first gear 95 may be fixably connected to the collar 90, according to an example, such that rotational movement of the first gear 95 causes a corresponding rotational movement of the collar 90, which causes a corresponding rotational movement of the head 40. As such, the teeth of the first pinion 100 are aligned and configured to engage the teeth of the first gear 95 such that rotational motion of the first pinion 100 causes the rotational motion of the first gear 95. The first motor 65 may drive motion of the first pinion 100. Thereafter, the motion of the first pinion 100 causes a corresponding and opposite motion of the first gear 95, which may then drive motion of the collar 90. Thereafter, the collar 90 may drive motion of the applicator head 40. The first pinion 100 may be any suitably sized pinion containing any suitable number of teeth. In another example, the first motor 65 may cause translational back-and-forth movement of the first pinion 100, which may cause a corresponding back-and-forth movement of the first gear 95, which may generate vibration of the collar 90 and head 40. In such a configuration, the corresponding teeth of the first gear 95 and/or the first pinion 100 include an additional retaining mechanism (not shown) that permits the locking of the first gear 95 with the first pinion 100. As shown in FIG. 1(G), the nozzle 50 extends through the collar 90 for extension through the head 40, and the first gear 95 is fixed around the collar 90 such that the nozzle 50 is surrounded by both the collar 90 and the first gear 95**, according to an example.

The device **5*a* may comprise a second gear 105 operatively connected to the rod 55, and a second pinion 110 operatively connecting the second motor 70 to the second gear 105. The second gear 105 may be any suitably sized gear containing any suitable number of teeth. Furthermore, the second pinion 110 may be any suitably sized pinion containing any suitable number of teeth. The second motor 70 may drive motion of the second pinion 110 such that the motion of the second pinion 110 may drive motion of the second gear 105, and the rotation of the second gear 105 may rotate the rod 55. Thereafter, the rotation of the rod 55 may translate the plate 60 within the cartridge 30 as the plate 60 is able to translate with respect to the rod 55 due to the complementary threads 80, 85, of the rod 55 and plate 60, respectively. Accordingly, the translation of the plate 60 in the cartridge 30 pushes the lubricant 35 in the cartridge 30, out through the egress port 31, in the nozzle 50, and then onto the head 40. In an example, the rod 55 may comprise a rod gear 56 (shown in FIG. 5) to engage the second gear 105**.

In device 5*a*, the first gear 95 and the second gear 105 do not engage with one another or drive one another or connect or contact with each other. Similarly, the first pinion 100 and the second pinion 110 do not engage with one another or drive one another or connect or contact with each other. Similarly, the first gear 95 and the second pinion 110 do not engage with one another or drive one another or connect or contact with each other. Similarly, the second gear 105 and the first pinion 100 do not engage with one another or drive one another or connect or contact with each other.

Figure 1F:
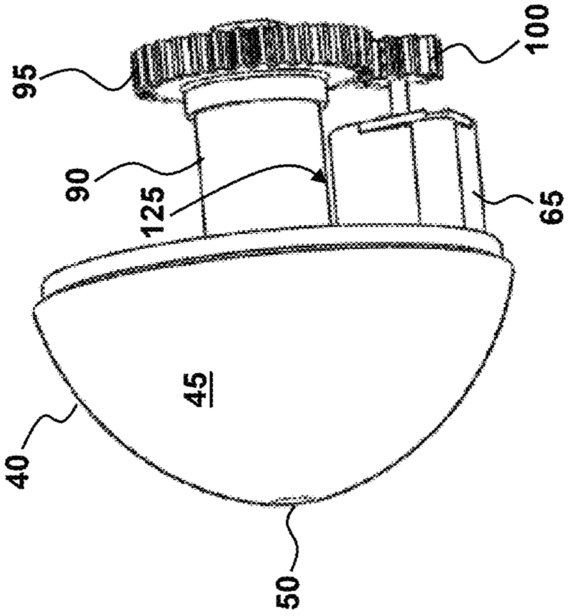
FIG. 1(F) is a first isolated view illustrating the front end of the lubricant dispensing buffing device of FIG. 1(A), according to a first embodiment herein.
Figure 1E:
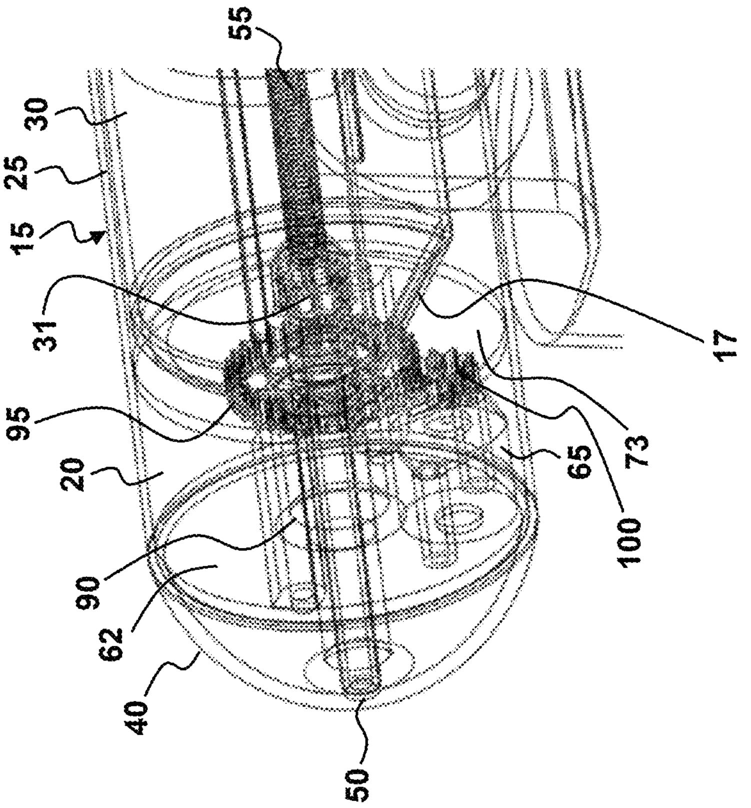
FIG. 1(E) is an isolated transparent view illustrating the front end of the lubricant dispensing buffing device of FIG. 1(A), according to a first embodiment herein.
Figure 1H:
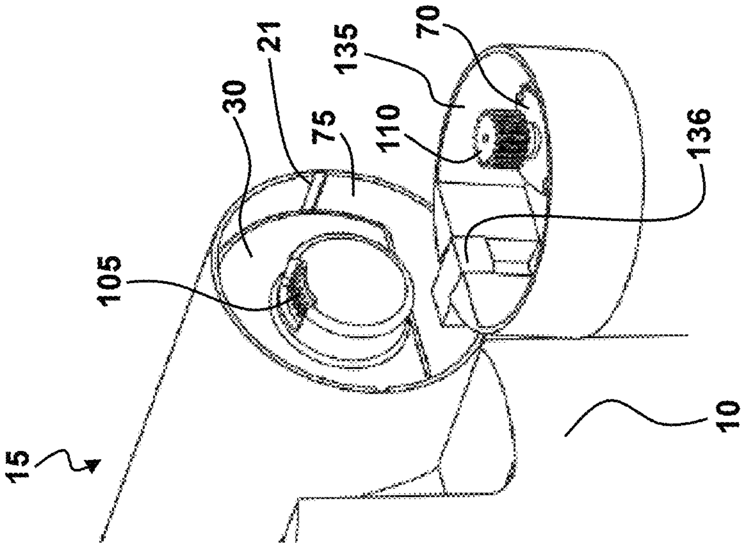
FIG. 1(H) is an isolated view illustrating the rear end of the lubricant dispensing buffing device of FIG. 1(A), according to a first embodiment herein.
Figure 1G:
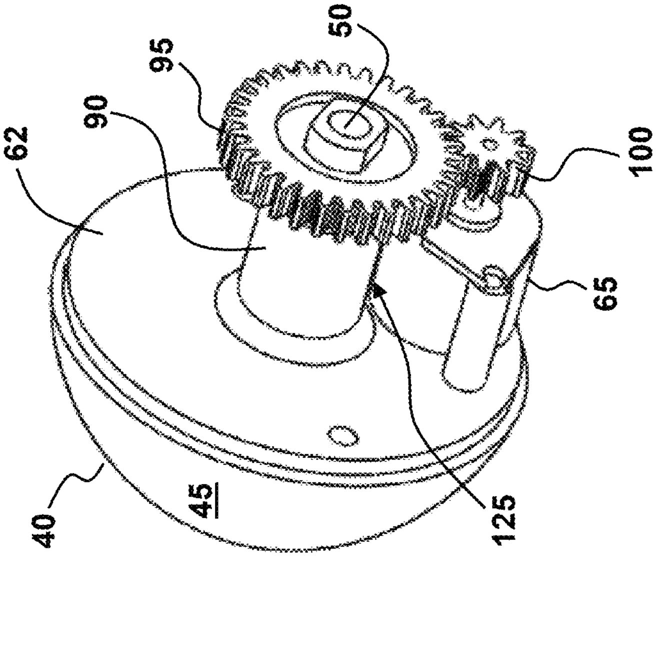
FIG. 1(G) is a second isolated view illustrating the front end of the lubricant dispensing buffing device of FIG. 1(A), according to a first embodiment herein.
Figure 1J:
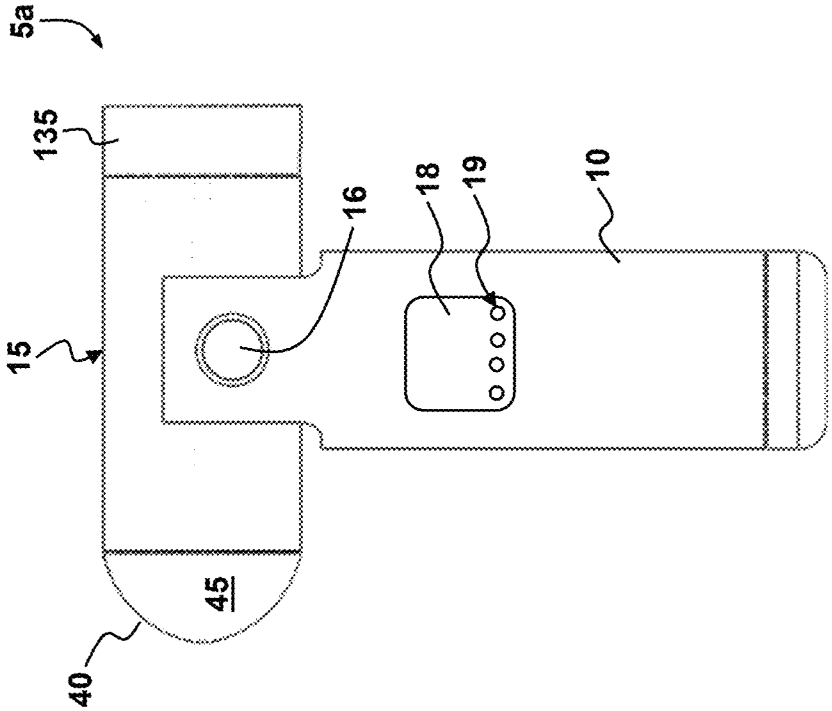
FIG. 1(J) is a side view illustrating the lubricant dispensing buffing device of FIG. 1(A), according to a first embodiment herein.
Figure 1I:
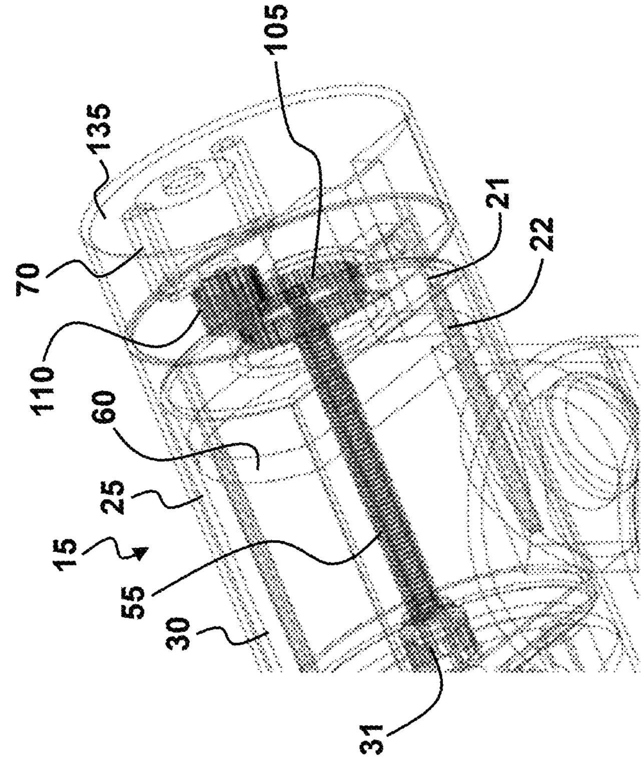
FIG. 1(I) is an isolated transparent view illustrating the rear end of the lubricant dispensing buffing device of FIG. 1(A), according to a first embodiment herein.

As shown in FIGS. 1(D), 1(F), and 1(G), the first motor 65 may be adjacent to a first lateral side 125 of the collar 90 in the first portion 20 of the housing 15. Moreover, as shown in FIGS. 1(C) and 1(D), the rod 55 may be positioned offset to a central longitudinal axis x of the cartridge 30. This is due to the eccentric (i.e., not exclusively cylindrical) shape of the cartridge 30 to accommodate a corresponding eccentric shaped plate 60 in FIGS. 1(A) through 1(J).

The housing 15 may further comprise a third portion 135 adjacent to the second portion 25 and at the rear end 3 of device 5*a*. The third portion 135 may serve as a rear cap to close the open second portion 25 of the housing 15. The third portion 135 may be configured in a substantially hollow open cylinder configuration such that the open end of the third portion 135 aligns with the open end of the second portion 25 of the housing 15. According to an example, the third portion 135 is configured to be smaller in size (i.e., length) than any of the first portion 20 and the second portion 25, respectively, although the embodiments herein may include examples where the third portion 135 and any of the first portion 20 and the second portion 25 comprise a substantially similar size as each other including examples where the sizes of the first portion, second portion 25, and third portion 135 are substantially the same as each other. In an example where the housing 15 comprises a substantially cylindrical shape, the respective diameters of the first portion 20, the second portion 25, and the third portion 135 are the same or are substantially the same.

In an example, the third portion 135 may be pivotally connected to the second portion 25. The pivotal connection of the third portion 135 may occur using a hinge 136 or other suitable pivot mechanism. In an example, the hinge 136 may provide a suitable locking feature when the third portion 135 is closed against the second portion 25 of the housing 15. Moreover, the third portion 135 may be opened by rotating the third portion 135 about the hinge 136, and moreover, in an example, the actuation of the opening of the third portion 135 may occur through a push-action technique whereby pushing the third portion 135 against the housing 15 when the third portion 135 is closed may cause the hinge 136 to create a rotational force and open the third portion 135. The cartridge 30 may be removably detachable from the housing 15 through the open-ended second portion 25 by way of opening the third portion 135 of the housing 15. In this regard, the cartridge 30 may be reloaded into the second portion 25 by opening the third portion 135 and inserting the cartridge 30 into the second portion 25 of the housing 15. As described above, the cartridge 30 may slide into the second portion 25 of the housing 15 using the interaction of the tracks 21 and guides 22. Once the cartridge 30 is seated in the second portion 25 of the housing 15, the third portion 135 may be rotated/pushed onto the housing 15 to close the second portion 25 of the housing 15.

While the second motor 70 may be positioned in any of the first portion 20, the second portion 25, and the third portion 135 of the housing 15, in the examples shown in FIGS. 1(A) through 1(J), the second motor 70 is positioned in the third portion 135 of the housing 15. When the third portion 135 of the housing 15 is closed, the second pinion 110 operatively connected to the second motor 70 aligns and engages the second gear 105. As described above, upon actuation of the second motor 70, the second pinion 110 actuates, causing the second gear 105 to actuate, causing the rod 55 to actuate, causing the plate 60 to translate, causing the lubricant 35 to be pushed by the plate 60 in the cartridge 30 and through the egress port 31 and into the nozzle 50, and out onto the head 40.

The device 5*a* may further comprise a power source 115 in the handle 10, and an electronic circuit board 120 in the handle 10 that is electrically connected to the display screen 18, power source 115, the first motor 65, and the second motor 70. In an example, the electrical connection between the electronic circuit board 120 in the handle 10 to the first motor 65 and the second motor 70 may occur through the rotational member 16 that attaches the handle 10 to the housing 15. In the housing 15, electrical traces/wires 101 may be appropriately arranged to provide electrical connections to the first motor 65 and the second motor 70. In another example, the first motor 65 and the second motor 70 may each comprise RFID components (e.g., one or more sensors 44 . . . 44*x*) to provide wireless communication 102 with the electronic circuit board 120. In an example, the power source 115 may be a DC electric power source, although other types of power sources are possible in accordance with the embodiments herein. The power source 115 may comprise one or more batteries, which may be disposable and/or rechargeable. Furthermore, the power source 115 may comprise multiple cells of lithium-ion batteries, such as 18650 Li-ion batteries, according to an example.

Figure 6:
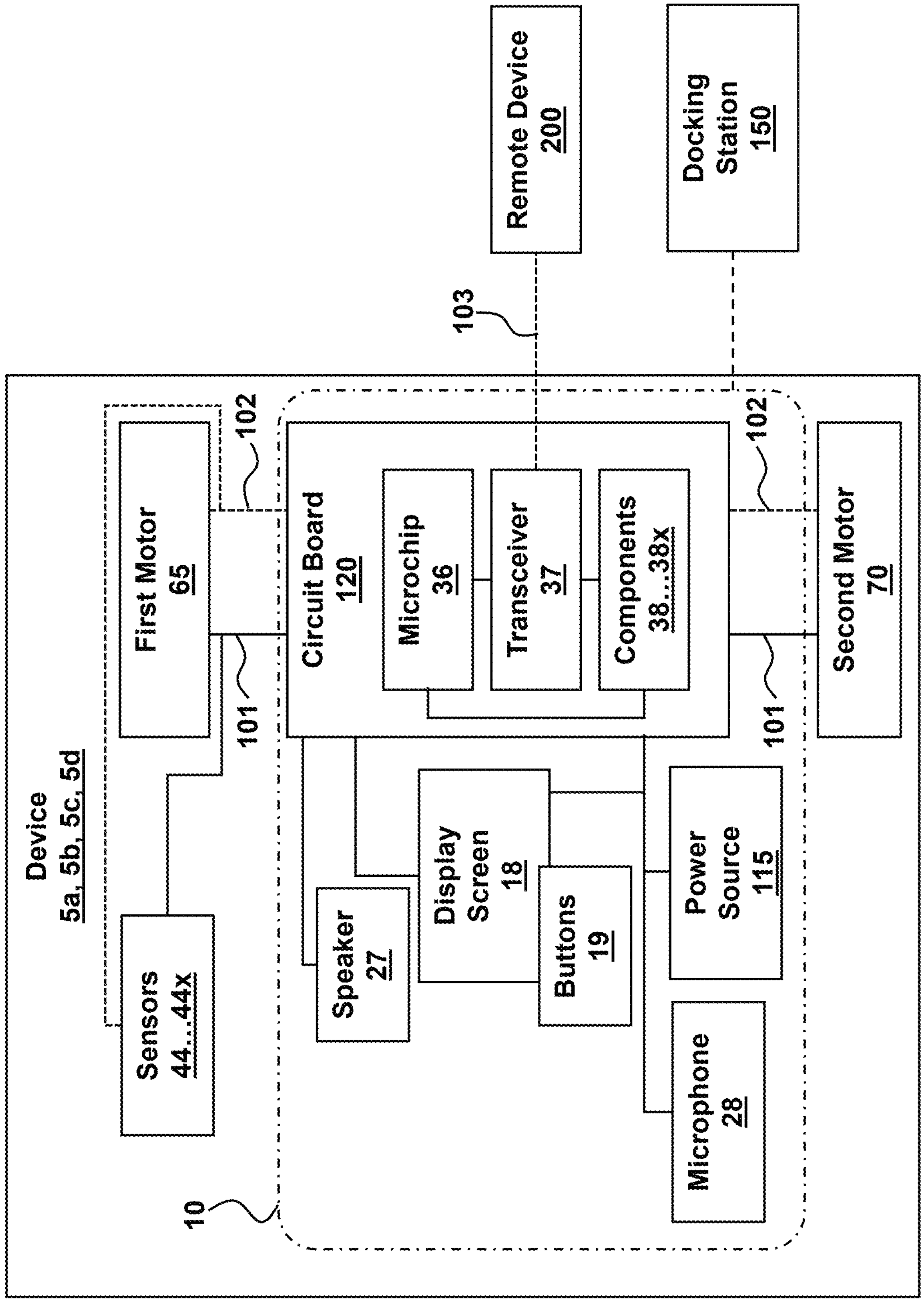
FIG. 6 is a block diagram of the electronics of the lubricant dispensing buffing devices of FIGS. 1(A), 2(A), 3(A), and 4(A), according to an embodiment herein.

In some examples, as shown in FIG. 6, the electronic circuit board 120 may comprise a microchip 36 and transceiver 37 among other microelectronic and/or circuit board components 38 (e.g., memory, other processors, etc.). The power source 115 is connected to the electronic circuit board 120 and the display screen 18. The transceiver 37 permits wired and/or wireless communication 103 to a remote device 200 that is communicatively coupled to the device 5*a*. In some examples, the remote device 200 may comprise any of a smartphone, tablet device, laptop, computer, server, or any other electronic communication device including smart appliances such as a television, smart speaker, or electronic virtual assistant devices. The buttons 19 of the display screen 18 and/or of the handle 10 and/or the remote device 200 may be used to transmit instructions through the microchip 36 of the electronic circuit board 120 for operation of the device 5*a* including actuation of the first motor 65 and second motor 70.

Figure 2B:
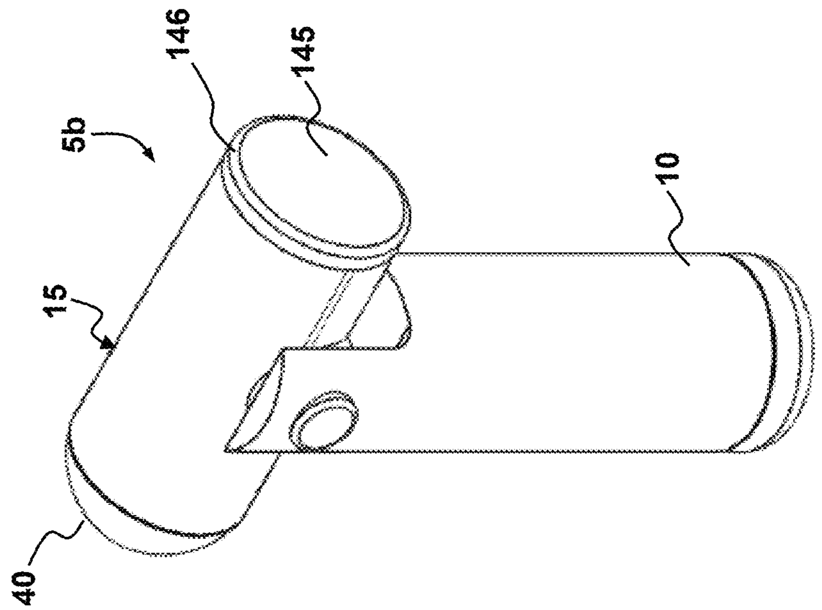
FIG. 2(B) is a rear perspective view illustrating the lubricant dispensing buffing device of FIG. 2(A), according to a second embodiment herein.
Figure 2A:
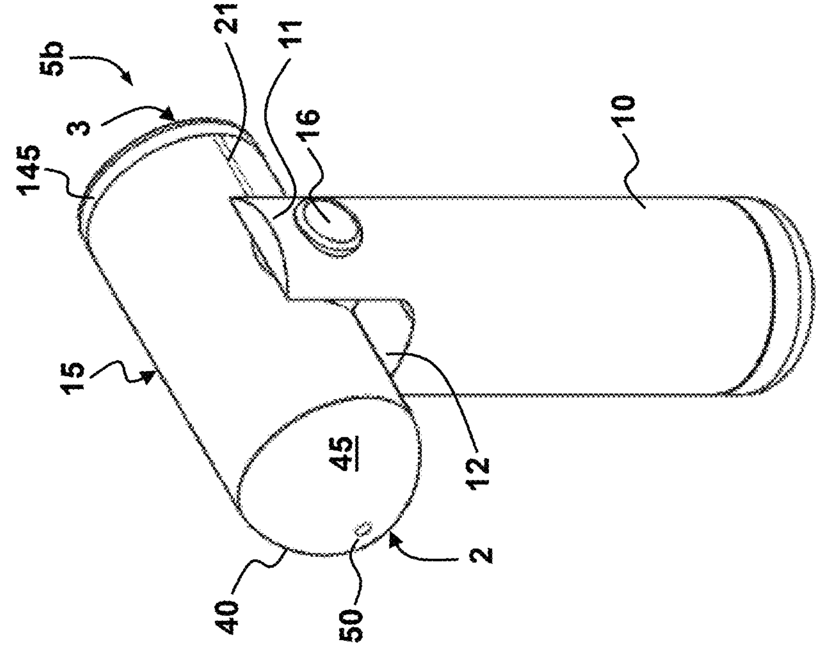
FIG. 2(A) is a front perspective view illustrating a lubricant dispensing buffing device, according to a second embodiment herein.

FIGS. 2(A) through 2(I) illustrate a hand-held lubricant dispensing buffing device 5*b*, according to a second embodiment herein. As shown in FIG. 2(A), the device 5*b* comprises a front end 2 and a rear end 3. The device 5*b* comprises a handle 10. The handle 10 may house various components such as microelectronics, batteries, as well as connecting mechanisms, among other components, as further described below. The handle 10 may be substantially elongated and dimensioned and configured to have a contoured shape to be easily held by a user. The handle 10 may comprise a LCD or LED illuminated display screen 18. For ease of view, the display screen 18 is only shown on the device 5*b* in FIG. 2(I). However, it is to be understood that the display screen 18 may be part of the handle 10 as provided in all of the other corresponding figures illustrating device 5*b*. Moreover, additional user buttons 19 may be configured on the display screen 18 as touch-enabled GUI buttons and/or the user buttons 19 may be positioned on the handle 10 itself as toggle or press-enabled buttons or a combination thereof. The display screen 18 and user buttons 19 may be positioned anywhere on the handle 10. The handle 10 may be configured to fit on a docking station or receptacle 150 (shown in FIG. 6), which may engage the device 5*b* at or near the base or bottom of the handle 10. The docking station or receptacle 150 may be utilized as a stand for the device 5*b* and/or power source, adapter, or charger for the device 5*b*, among other uses.

The device 5*b* further comprises a housing 15 operatively connected to the handle 10. In an example, the handle 10 may be pivotally connected to the housing 15. More specifically, the handle 10 may pivotally or rotationally attach to the housing 15 through a rotational member 16 such as a pin, dowel, screw, or any other suitable rotational member. In another example, the handle 10 and the housing 15 may detachably connect to each other. In an example, the rotational member 16 may permit the housing 15 to lock to the handle 10 and upon rotation of the housing 15 with respect to the handle 10, the rotational member 16 may comprise a series of locking positions to permit the housing 15 to be locked in various angular positions with respect to the handle 10. The housing 15 may comprise a substantially elongated configuration having a substantially cylindrical shape, although other shapes and configurations are possible in accordance with the embodiments herein.

Figure 2D:
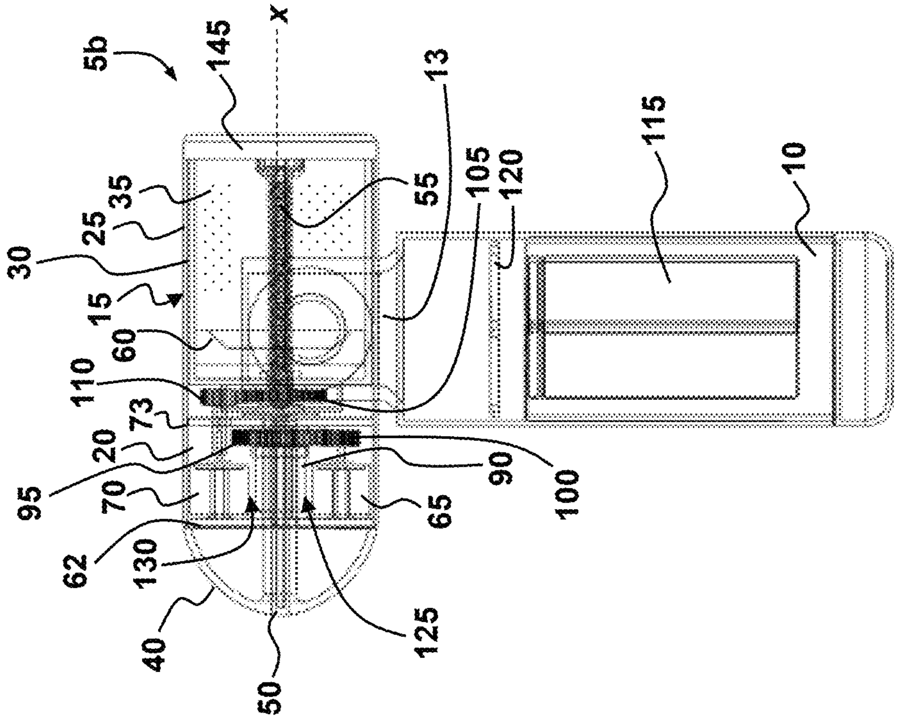
FIG. 2(D) is a second cross-sectional view illustrating the lubricant dispensing buffing device of FIG. 2(A), according to a second embodiment herein.

The handle 10 may comprise one or more upper arms 11 with a recessed seat 12 positioned adjacent to the one or more upper arms 11. In an example with a pair of arms 11, the rotational member 16 may be positioned in each upper arm 11 such that there may be a separate rotational member 16 for each arm 11 for connection to the housing 15. In an example with a pair of arms 11, the spacing between the upper arms 11 defines the width of the recessed seat 12 and is configured to accommodate the width of the housing 15. A gap 13 as further identified in FIG. 2(D) is provided between the seat 12 and the housing 15 to permit the housing 15 to have clearance for rotation about the rotational member 16 with respect to the handle 10.

The housing 15 comprises a first portion 20 and a second portion 25. The first portion 20 and the second portion 25 may be connected together such that the housing 15 contains both the first portion 20 and the second portion 25. The device 5*b* may comprise a front wall 62 on the first portion 20 of the housing 15. Moreover, the device 5*b* may comprise a wall 73 in the housing 15 that separates the first portion 20 from the second portion 25 as shown in FIGS. 2(C) through 2(G). The first portion 20 and the second portion 25 may be defined as internal chambers of the housing 15 to house additional components, as further described below. The second portion 25 is configured to be larger in size than the first portion 20, although the embodiments herein may include examples where the first portion 20 and the second portion 25 comprise a substantially similar size as each other. In an example where the housing 15 comprises a substantially cylindrical shape, the respective diameters of the first portion 20 and the second portion 25 are the same or are substantially the same. In an example, the handle 10 is configured to attach to the housing 15 adjacent to the second portion 25, although other examples permit the attachment of the handle 10 to the housing 15 to occur at the first portion 20. In an unpivoted arrangement, the handle 10 and housing 15 may form a substantially "T" shape such that the handle 10 and housing 15 are transversely positioned with respect to each other, although other shapes are possible, and the embodiments herein are not restricted to a particular shape and/or configuration. According to the second embodiment of the device 5*b* shown in FIGS. 2(A) through 2(I), the handle 10 and the housing 15 may comprise substantially equal lengths. The housing 15 may further comprise one or more tracks 21 that may be positioned external to the housing 15 and on the second portion 25 as identified in FIGS. 2(A) and 2(B). The one or more tracks 21 may be configured as rails, grooves, or any other type of suitable track structures.

Figure 2C:
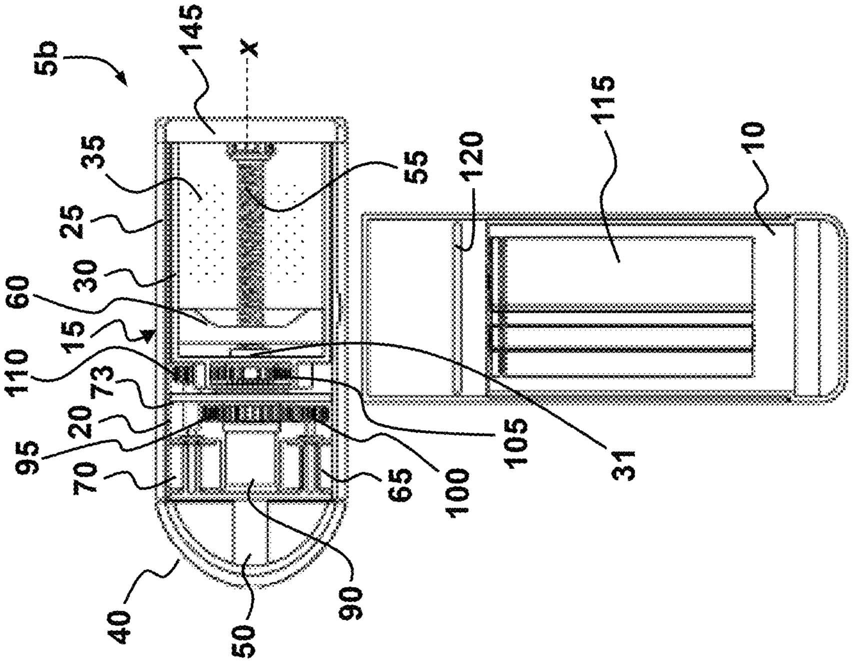
FIG. 2(C) is a first cross-sectional view illustrating the lubricant dispensing buffing device of FIG. 2(A), according to a second embodiment herein.
Figure 2F:
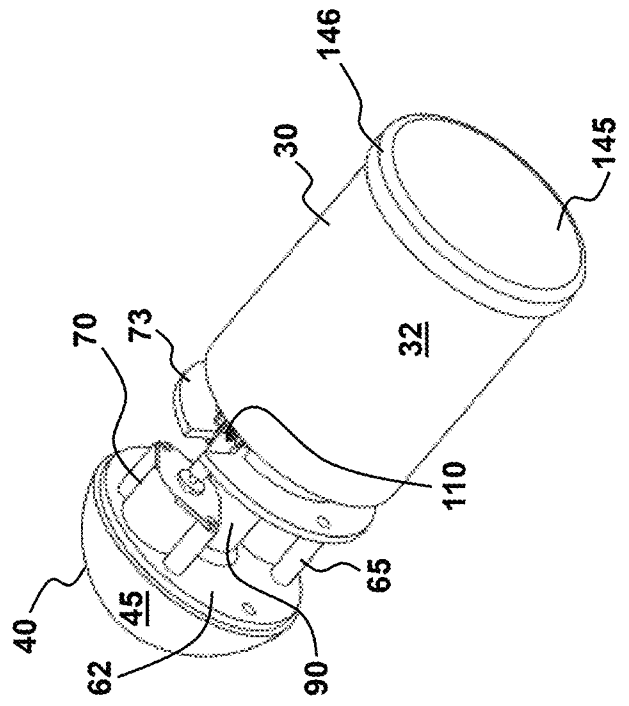
FIG. 2(F) is a second isolated view illustrating the front end and cartridge of the lubricant dispensing buffing device of FIG. 2(A), according to a second embodiment herein.
Figure 2E:
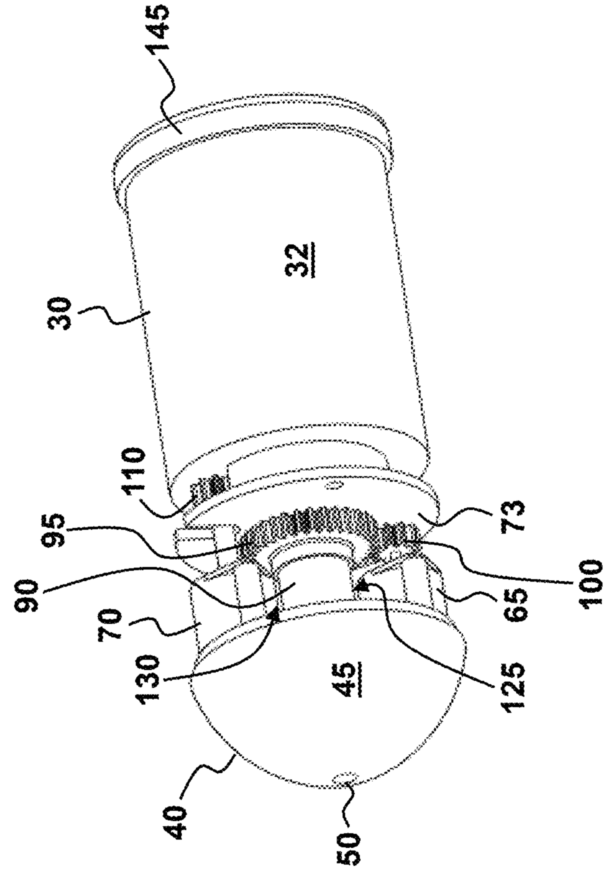
FIG. 2(E) is a first isolated view illustrating the front end and cartridge of the lubricant dispensing buffing device of FIG. 2(A), according to a second embodiment herein.
Figure 2H:
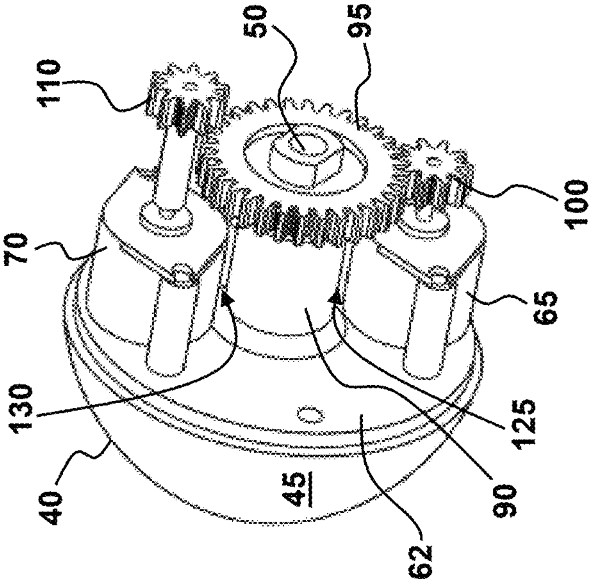
FIG. 2(H) is an isolated view illustrating the front end of the lubricant dispensing buffing device of FIG. 2(A), according to a second embodiment herein.
Figure 2G:
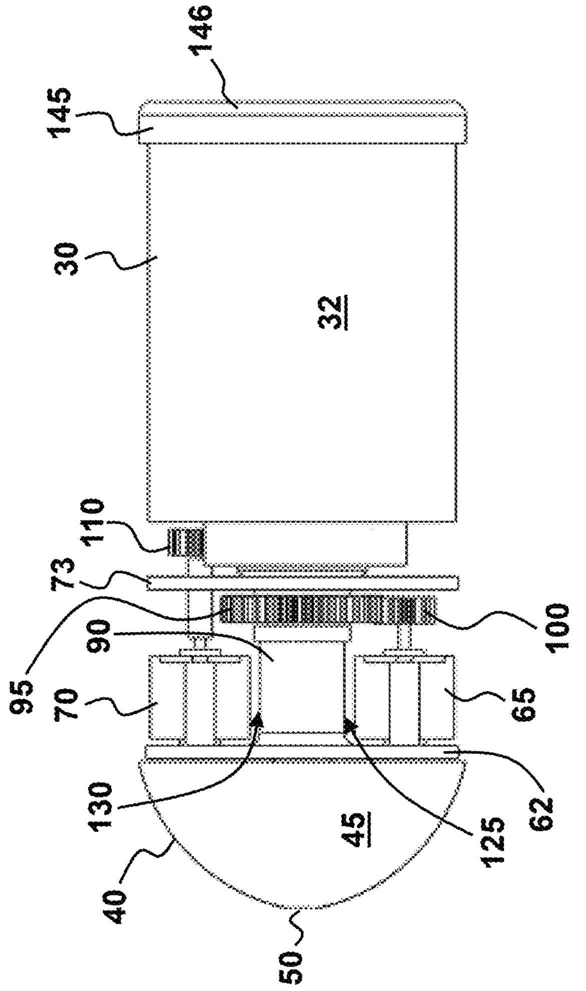
FIG. 2(G) is an isolated side view illustrating the front end and cartridge of the lubricant dispensing buffing device of FIG. 2(A), according to a second embodiment herein.
Figure 2I:
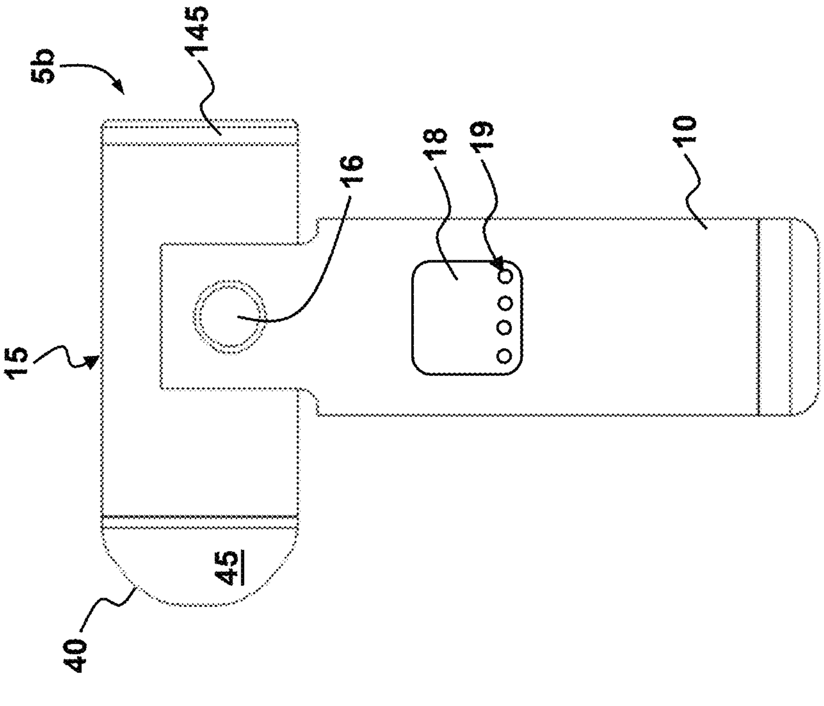
FIG. 2(I) is a side view illustrating the lubricant dispensing buffing device of FIG. 2(A), according to a second embodiment herein.

The device 5*b* further comprises a cartridge 30 positioned inside the second portion 25 of the housing 15. As such, the cartridge 30 is adapted to fit in the second portion 25 of the housing 15 and is configured to be slightly smaller in length, width, and height compared to the second portion 25 of the housing 15 such that the cartridge 30 snugly fits in the second portion 25 of the housing 15, but such that the cartridge 30 can be removably detached from the second portion 25 of the housing 15. In such an example, there is no significant gap or spacing between the cartridge 30 and the inside of the second portion 25 of the housing 15. In an example, the cartridge 30 may comprise a substantially elongated tube or cylindrical configuration. In an example, the cartridge 30 may comprise a substantially smooth outer surface 32 as shown in FIGS. 2(E), 2(F), and 2(G). According to an example, the one or more tracks 21 of the housing 15 may be indented such that the tracks 21 protrude into the second portion 25 of the housing 15 in order to more snugly engage the cartridge 30 of device 5*b*. In such an example, engagement of the tracks 21 against the cartridge 30 allows for proper seating of the cartridge 30 in the housing 15 and to reduce vibration and movement of the cartridge 30 in the housing 15.

In the device 5*b*, the cartridge 30 is adapted to contain a bio-safe lubricant 35. The lubricant 35 may be a drug in the form of a cream, gel, or other fluid of suitable viscosity and may be loaded into the cartridge 30 using a syringe or other inserter mechanism. In an example, the cartridge 30 may be reusable such that the lubricant 35 may be reloaded therein as-needed. In another example, the cartridge 30 may be disposable once the lubricant 35 is exhausted from therein. Moreover, the lubricant 35 is adapted to fill the cartridge 30 and may or may not be pressurized. Additionally, the lubricant 35 may comprise any type of lubricant that may be used for dermatological and/or other medical uses as well as non-medical uses. In an example, to ensure a lack of contamination, the cartridge 30 is configured to be sealed to prevent the lubricant 35 from escaping therefrom except from a suitable egress port 31. According to an example, the egress port 31, as identified in FIG. 2(C), may be configured to actuate between an opened position (to allow the lubricant to dispense from the cartridge 30) and closed position (to retain the lubricant 35 in the cartridge 30).

The device 5*b* further comprises an applicator head 40 attached to the front wall 62 of the first portion 20 of the housing 15 such that the applicator head 40 is aligned with the housing 15 and positioned at the tip (e.g., the front end 2 that is adjacent to the first portion 20 and away from the second portion 25) of the housing 15. In an example, the applicator head 40 comprises a smooth surface 45 devoid of abrasive particles and bristles. The head 40 may be substantially bulbous in shape although other shapes and configurations are possible. As such, the head 40 may be contoured to any suitable shape which provides comfort and ease when pressed and rotated against a user's skin. The head 40 may be made of plastic, rubber, silicone, a composite, or glass, or a combination thereof. Moreover, the head 40 may be detachably connected to the front wall 62 of the first portion of the housing 15 to facilitate changing between different heads and/or ease of cleaning or disinfection of the head 40, as necessary.

The device 5*b* further comprises a nozzle 50 operatively connected and aligned to the egress port 31 of the cartridge 30 and extending through the applicator head 40. The nozzle 50 is to discharge the lubricant 35 out from the applicator head 40. There may be a RFID component (e.g., one or more sensors 44 . . . 44*x* (of FIG. 6)) inside the nozzle 50 which may indicate how much lubricant 35 to dispense per instance that a button (e.g., buttons 19) on the handle 10 of the device 5*b* is pushed. Furthermore, the nozzle 50 may be configured in different sizes such that a larger sized nozzle 50 may discharge a greater amount of lubricant 35 compared with a smaller sized nozzle 50.

The head 40 of device 5*b* may be configured in a narrow, small, moderate, or large configuration, among other sizes and configurations. In an example, the narrow configuration may comprise an approximately 12 mm circumference of the head 40 with an opening of the nozzle 50 of approximately 3 mm. In an example, the small configuration may comprise an approximately 18 mm circumference of the head 40 with an opening of the nozzle 50 of approximately 4-5 mm. In an example, the moderate configuration may comprise an approximately 26 mm circumference of the head 40 with an opening of the nozzle 50 of approximately 5-6 mm. In an example, the large configuration may comprise an approximately 36 mm circumference of the head 40 with an opening of the nozzle 50 of approximately 6+ mm. The above dimensions are merely examples, and the embodiments herein are not restricted to these particular dimensions and configurations. The narrow configuration may correspond with a relatively slow rate of discharge of the lubricant 35 from the nozzle 50. The small configuration may correspond with a relatively mild rate of discharge of the lubricant 35 from the nozzle 50. The moderate configuration may correspond with a relatively moderate rate of discharge of the lubricant 35 from the nozzle 50. The large configuration may correspond with a relatively heavy rate of discharge of the lubricant 35 from the nozzle 50.

The device 5*b* further comprises a rod 55 in the cartridge 30. The rod 55 may comprise an elongated longitudinal member and may be configured as a shaft, screw, or any other advancement mechanism. The rod 55 may comprise a length that is substantially the same or similar to the length of the cartridge 30 as the rod 55 extends from one end of the cartridge 30 to the longitudinally opposing end thereof. The rod 55 may be held in place by any suitable retaining mechanism such as pins, screws, nails, brackets, adhesives, or may be engaged to another structural component in or on the cartridge 30 to retain the rod 55 in place without slipping or become dislodged or disengaged.

The device 5*b* further comprises a plate 60 connected to the rod 55 and positioned in the cartridge 30. The plate 60 may comprise any of a substantially disk configuration, angled configuration, symmetrical configuration, and eccentric configuration, etc., according to various examples. In an example, the plate 60 may be configured as a plunger or piston. As shown in FIG. 5, the rod 55 may comprise threads 80 that engage complementary threads 85 of the plate 60, according to an example to permit the rod 55 to rotationally actuate the plate 60. In use, the lubricant 35 is loaded or pre-loaded into the cartridge 30 and rotation of the rod 55 causes translation of the plate 60 in a direction towards the egress port 31 of the cartridge 30 (e.g., from the second portion 25 towards the first portion 20 of the housing 15), which causes the lubricant 35 to be transferred from the cartridge 30 through the egress port 31. The nozzle 50 may extend and align/attach to the egress port 31 to permit the lubricant 35 to move to the nozzle 50. The interface of the egress port 31 and nozzle 50 may be suitably sealed to prevent the lubricant 35 from escaping into the first portion 20 of the housing 15 and causing leakage as well as preventing contamination of other components of the device 5*b*. Movement of the lubricant 35 through the nozzle 50 continues out through the opening or hole of the nozzle 50 where the nozzle 50 terminates at the head 40 for application of the lubricant 35 onto a user's skin, etc.

The device 5*b* further comprises a first motor 65 in the first portion 20 of the housing 15. According to an example, the first motor 65 may be attached to the front wall 62 of the first portion 20 of the housing 15. The first motor 65 is to drive motion of the applicator head 40. In some examples, the motion of the applicator head 40 may comprise any of a swivel motion, rotation motion, vibration motion, or a combination thereof. In an example, the head 40 may move, rotate, etc. in variable speeds and at variable revolution angles according to a user's command as input through the buttons 19 or through other input mechanisms including voice command. Additionally, the first motor 65 may be a stepper motor, according to an example, and may be a variable speed motor offering both clockwise and counter-clockwise revolution motion and may also have vibrational effects. The first motor 65 may be waterproofed using a suitable sealing mechanism and/or structure.

The device 5*b* further comprises a second motor 70 operatively connected to the rod 55. In an example, the second motor 70 is to drive motion of the rod 55 in the cartridge 30. Moreover, the rod 55 is to drive motion of the plate 60 in the cartridge 30. The second motor 70 is to drive motion of the actuation of dispensing of the lubricant 35 in the cartridge 30. Additionally, the second motor 70 may be a stepper motor, according to an example, and may be a variable speed motor offering both clockwise and counter-clockwise revolution motion and may also have vibrational effects. The second motor 70 may be waterproofed using a suitable sealer, sealing mechanism and/or structure.

The device 5*b* may comprise a collar 90 surrounding the nozzle 50 in the first portion 20 of the housing 15 or in the applicator head 40 or a combination thereof. The collar 90 may be an elongated structure such as a tube that contains the nozzle 50. Moreover, the collar 90 may be fixably attached to the front wall 62 and may be longitudinally aligned with the egress port 31 of the cartridge 30. The device 5*b* further comprises a first gear 95 operatively connected to the collar 90, and a first pinion 100 operatively connecting the first motor 65 to the first gear 95. The first gear 95 may be any suitably sized gear containing any suitable number of teeth. Moreover, the first gear 95 may be fixably connected to the collar 90 according to an example such that rotational movement of the first gear 95 causes a corresponding rotational movement of the collar 90, which causes a corresponding rotational movement of the head 40. As such, the teeth of the first pinion 100 are aligned and configured to engage the teeth of the first gear 95 such that rotational motion of the first pinion 100 causes the rotational motion of the first gear 95. The first motor 65 may drive motion of the first pinion 100. Thereafter, the motion of the first pinion 100 causes a corresponding and opposite motion of the first gear 95, which may then drive motion of the collar 90. Thereafter, the collar 90 may drive motion of the applicator head 40. The first pinion 100 may be any suitably sized pinion containing any suitable number of teeth. In another example, the first motor 65 may cause translational back-and-forth movement of the first pinion 100, which may cause a corresponding back-and-forth movement of the first gear 95, which may generate vibration of the collar 90 and head 40. In such a configuration, the corresponding teeth of the first gear 95 and/or the first pinion 100 include an additional retaining mechanism (not shown) that permits the locking of the first gear 95 with the first pinion 100. As shown in FIG. 2(H), the nozzle 50 extends through the collar 90 for extension through the head 40, and the first gear 95 is fixed around the collar 90 such that the nozzle 50 is surrounded by both the collar 90 and the first gear 95, according to an example.

The device 5*b* may comprise a second gear 105 operatively connected to the rod 55, and a second pinion 110 operatively connecting the second motor 70 to the second gear 105. The second gear 105 may be any suitably sized gear containing any suitable number of teeth. Furthermore, the second pinion 110 may be any suitably sized pinion containing any suitable number of teeth. The second motor 70 may drive motion of the second pinion 110 such that the motion of the second pinion 110 may drive motion of the second gear 105, and the rotation of the second gear 105 may rotate the rod 55. Thereafter, the rotation of the rod 55 may translate the plate 60 within the cartridge 30 as the plate 60 is able to translate with respect to the rod 55 due to the complementary threads 80, 85, of the rod 55 and plate 60, respectively. Accordingly, the translation of the plate 60 in the cartridge 30 pushes the lubricant 35 in the cartridge 30, out through the egress port 31, in the nozzle 50, and then onto the head 40. In an example, the rod 55 may comprise a rod gear 56 (shown in FIG. 5) to engage the second gear 105.

In device 5*b*, the first gear 95 and the second gear 105 do not engage with one another or drive one another or connect or contact with each other. Similarly, the first pinion 100 and the second pinion 110 do not engage with one another or drive one another or connect or contact with each other. Similarly, the first gear 95 and the second pinion 110 do not engage with one another or drive one another or connect or contact with each other. Similarly, the second gear 105 and the first pinion 100 do not engage with one another or drive one another or connect or contact with each other.

As shown in FIGS. 2(D), 2(E), 2(G), and 2(H), the first motor 65 may be adjacent to a first lateral side 125 of the collar 90 in the first portion 20 of the housing 15. Moreover, as shown in FIGS. 2(C) and 2(D), the rod 55 may be positioned along a central longitudinal axis x of the cartridge 30. This is due to the substantially cylindrical shape of the cartridge 30. Furthermore, as shown in FIGS. 2(D), 2(E), 2(G), and 2(H), the second motor 70 may be adjacent to a second lateral side 130 of the collar 90 in the first portion 20 of the housing 15. The first lateral side 125 and the second lateral side 130 may be on opposite sides of the nozzle 50.

The housing 15 may further comprise an end cap 145 adjacent to the second portion 25 and at the rear end 3 of device 5*b*. The end cap 145 may serve as a rear cap to close the open second portion 25 of the housing 15. The end cap 145 may be configured as a push on, twist on, or other suitable type of cap such that the end cap 145 aligns with the open end of the second portion 25 of the housing 15. According to an example, the end cap 145 is configured to be smaller in size (i.e., length) than any of the first portion 20 and the second portion 25, respectively, although the embodiments herein may include examples where the end cap 145 and any of the first portion 20 and the second portion 25 comprise a substantially similar size as each other including examples where the sizes of the first portion, second portion 25, and end cap 145 are substantially the same as each other. In an example where the housing 15 comprises a substantially cylindrical shape, the respective diameters of the first portion 20, the second portion 25, and the end cap 145 are the same or are substantially the same. Additionally, as shown in FIGS. 2(A) through 2(I), the diameter of the end cap 145 is larger than the diameter of the cartridge 30. According to an example, as shown in FIGS. 2(B), 2(F), and 2(G), the end cap 145 may have a lip 146, which may help to facilitate engagement and disengagement of the end cap 145 on/from the second portion 25.

The cartridge 30 may be removably detachable from the housing 15 through the open-ended second portion 25 by way of opening the end cap 145 of the housing 15. In this regard, the cartridge 30 may be reloaded into the second portion 25 by opening the end cap 145 and inserting the cartridge 30 into the second portion 25 of the housing 15. Once the cartridge 30 is seated in the second portion 25 of the housing 15, the end cap 145 may be pushed/placed, etc. on the second portion 25 of the housing 15 to close the second portion 25 of the housing 15.

While the second motor 70 may be positioned in any of the first portion 20, the second portion 25, and the end cap 145 of the housing 15, in the examples shown in FIGS. 2(A) through 2(1), the second motor 70 is positioned in the front portion 20 of the housing 15 and adjacent to the collar 90. The second pinion 110 operatively connected to the second motor 70 aligns and engages the second gear 105. As described above, upon actuation of the second motor 70, the second pinion 110 actuates, causing the second gear 105 to actuate, causing the rod 55 to actuate, causing the plate 60 to translate, causing the lubricant 35 to be pushed by the plate 60 in the cartridge 30 and through the egress port 31 and into the nozzle 50, and out onto the head 40.

The device 5*b* may further comprise a power source 115 in the handle 10, and an electronic circuit board 120 in the handle 10 that is electrically connected to the display screen 18, power source 115, the first motor 65, and the second motor 70. In an example, the electrical connection between the electronic circuit board 120 in the handle 10 to the first motor 65 and the second motor 70 may occur through the rotational member 16 that attaches the handle 10 to the housing 15. In the housing 15, electrical traces/wires 101 may be appropriately arranged to provide electrical connections to the first motor 65 and the second motor 70. In another example, the first motor 65 and the second motor 70 may each comprise RFID components (e.g., one or more sensors 44 . . . 44*x*) to provide wireless communication 102 with the electronic circuit board 120. In an example, the power source 115 may be a DC electric power source, although other types of power sources are possible in accordance with the embodiments herein. The power source 115 may comprise one or more batteries, which may be disposable and/or rechargeable. Furthermore, the power source 115 may comprise multiple cells of lithium-ion batteries, such as 18650 Li-ion batteries, according to an example.

In some examples, as shown in FIG. 6, the electronic circuit board 120 may comprise a microchip 36 and transceiver 37 among other microelectronic and/or circuit board components 38 . . . 38x (e.g., memory, other processors, etc.). The power source 115 is connected to the electronic circuit board 120 and the display screen 18. The transceiver 37 permits wired and/or wireless communication 103 to a remote device 200 that is communicatively coupled to the device 5b. In some examples, the remote device 200 may comprise any of a smartphone, tablet device, laptop, computer, server, or any other electronic communication device including smart appliances such as a television, smart speaker, or electronic virtual assistant devices. The buttons 19 of the display screen 18 and/or of the handle 10 and/or the remote device 200 may be used to transmit instructions through the microchip 36 of the electronic circuit board 120 for operation of the device 5b including actuation of the first motor 65 and second motor 70.

Figure 3B:
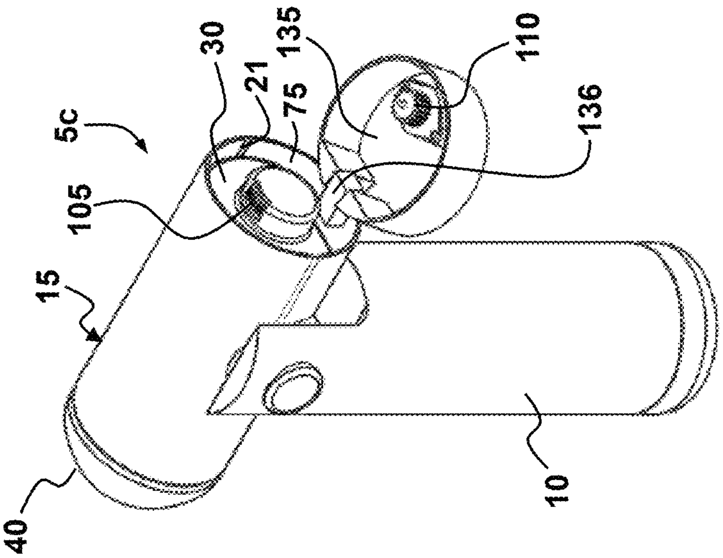
FIG. 3(B) is a rear perspective view illustrating the lubricant dispensing buffing device of FIG. 3(A), according to a third embodiment herein.
Figure 3A:
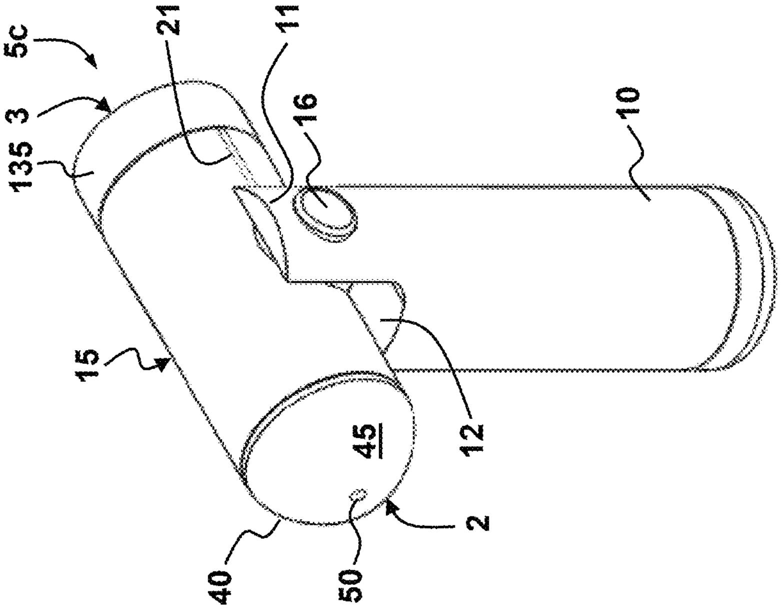
FIG. 3(A) is a front perspective view illustrating a lubricant dispensing buffing device, according to a third embodiment herein.

FIGS. 3(A) through 3(H) illustrate a hand-held lubricant dispensing buffing device 5c, according to a third embodiment herein. As shown in FIG. 3(A), the device 5c comprises a front end 2 and a rear end 3. The device 5c comprises a handle 10. The handle 10 may house various components such as microelectronics, batteries, as well as connecting mechanisms, among other components, as further described below. The handle 10 may be substantially elongated and dimensioned and configured to have a contoured shape to be easily held by a user. The handle 10 may comprise a LCD or LED illuminated display screen 18. For ease of view, the display screen 18 is only shown on the device 5c in FIG. 3(H). However, it is to be understood that the display screen 18 may be part of the handle 10 as provided in all of the other corresponding figures illustrating device 5c. Moreover, additional user buttons 19 may be configured on the display screen 18 as touch-enabled GUI buttons and/or the user buttons 19 may be positioned on the handle 10 itself as toggle or press-enabled buttons or a combination thereof.

The display screen 18 and user buttons 19 may be positioned anywhere on the handle 10. The handle 10 may be configured to fit on a docking station or receptacle 150 (shown in FIG. 6), which may engage the device 5c at or near the base or bottom of the handle 10. The docking station or receptacle 150 may be utilized as a stand for the device 5c and/or power source, adapter, or charger for the device 5c, among other uses.

The device 5c further comprises a housing 15 operatively connected to the handle 10. In an example, the handle 10 may be pivotally connected to the housing 15. More specifically, the handle 10 may pivotally or rotationally attach to the housing 15 through a rotational member 16 such as a pin, dowel, screw, or any other suitable rotational member. In another example, the handle 10 and the housing 15 may detachably connect to each other. In an example, the rotational member 16 may permit the housing 15 to lock to the handle 10 and upon rotation of the housing 15 with respect to the handle 10, the rotational member 16 may comprise a series of locking positions to permit the housing 15 to be locked in various angular positions with respect to the handle 10. The housing 15 may comprise a substantially elongated configuration having a substantially cylindrical shape, although other shapes and configurations are possible in accordance with the embodiments herein.

Figure 3D:
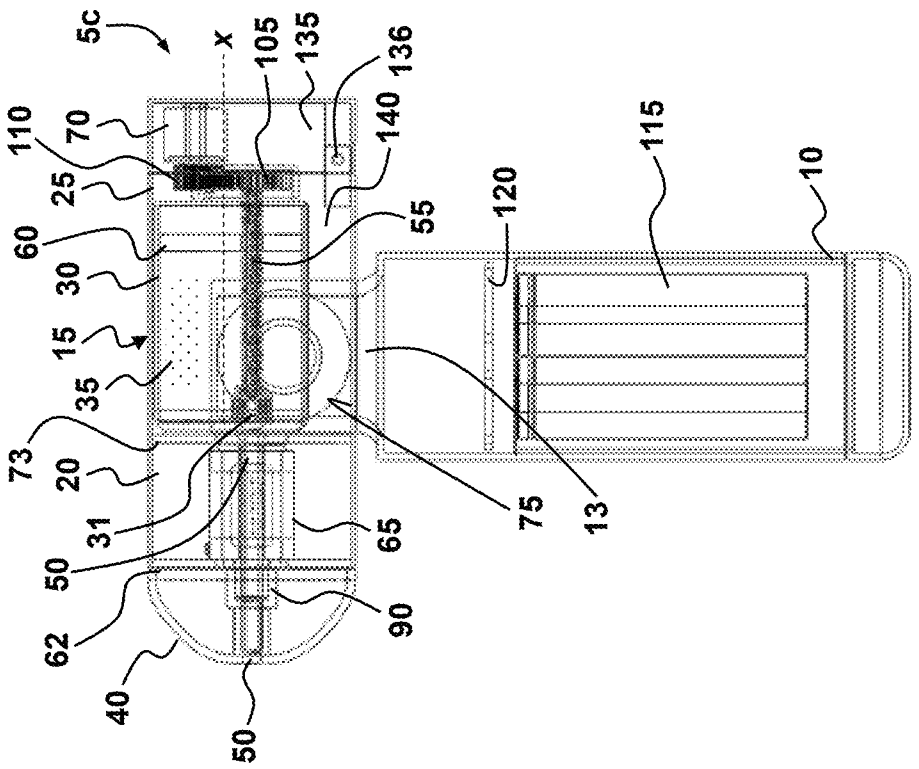
FIG. 3(D) is a second cross-sectional view illustrating the lubricant dispensing buffing device of FIG. 3(A), according to a third embodiment herein.

The handle 10 may comprise one or more upper arms 11 with a recessed seat 12 positioned adjacent to the one or more upper arms 11. In an example with a pair of arms 11, the rotational member 16 may be positioned in each upper arm 11 such that there may be a separate rotational member 16 for each arm 11 for connection to the housing 15. In an example with a pair of arms 11, the spacing between the upper arms 11 defines the width of the recessed seat 12 and is configured to accommodate the width of the housing 15. A gap 13 as further identified in FIG. 3(D) is provided between the seat 12 and the housing 15 to permit the housing 15 to have clearance for rotation about the rotational member 16 with respect to the handle 10.

The housing 15 comprises a first portion 20 and a second portion 25. The first portion 20 and the second portion 25 may be connected together such that the housing 15 contains both the first portion 20 and the second portion 25. The device 5c may comprise a front wall 62 on the first portion 20 of the housing 15. Moreover, the device 5c may comprise a wall 73 in the housing 15 that separates the first portion 20 from the second portion 25 as shown in FIGS. 3(C), 3(D), 3(E), and 3(F). The first portion 20 and the second portion 25 may be defined as internal chambers of the housing 15 to house additional components, as further described below. The second portion 25 is configured to be larger in size than the first portion 20, although the embodiments herein may include examples where the first portion 20 and the second portion 25 comprise a substantially similar size as each other. In an example where the housing 15 comprises a substantially cylindrical shape, the respective diameters of the first portion 20 and the second portion 25 are the same or are substantially the same. In an example, the handle 10 is configured to attach to the housing 15 adjacent to the second portion 25, although other examples permit the attachment of the handle 10 to the housing 15 to occur at the first portion 20. In an unpivoted arrangement, the handle 10 and housing 15 may form a substantially "T" shape such that the handle 10 and housing 15 are transversely positioned with respect to each other, although other shapes are possible, and the embodiments herein are not restricted to a particular shape and/or configuration. According to the third embodiment of the device 5c shown in FIGS. 3(A) through 3(H), the handle 10 and the housing 15 may comprise substantially equal lengths. The housing 15 may further comprise one or more tracks 21 that may be positioned internal and external to the housing 15 and on the second portion 25 as identified in FIGS. 3(A) and 3(B). The one or more tracks 21 may be configured as rails, grooves, or any other type of suitable track structures.

The device 5c further comprises a cartridge 30 positioned inside the second portion 25 of the housing 15. As such, the cartridge 30 is adapted to fit in the second portion 25 of the housing 15 and is configured to be smaller in length, width, and height compared to the second portion 25 of the housing 15. In an example, the cartridge 30 may comprise a substantially elongated tube configuration with a flat side 17 facing the handle 10 as indicated in FIG. 3(E). In an example, the cartridge 30 may comprise one or more guides 22 configured along the outside of the cartridge 30 to engage the one or more tracks 21 of the housing 15. In an example, the guides 22 may comprise a protrusion on the outside of the cartridge 30 and the tracks 21 may comprise an indent to accommodate the guides 22. In another example, the tracks 21 may comprise a protrusion on, at least the inside wall 75 of the housing 15 as shown in FIGS. 3(B) and 3(G), and the guides 22 may comprise an indent to accommodate the tracks 21. According to an example, the guides 22 may slidably engage the tracks 21. Engagement of the guides 22 with the tracks 21 allows for proper seating of the cartridge 30 in the housing 15 and to reduce vibration and movement of the cartridge 30 in the housing 15. The device 5c may comprise a gap 140 between the cartridge 30 and the inner wall 75 of the second portion 25 of the housing 15 as further shown in FIGS. 3(C) and 3(D). In some examples, the gap 140 may be a hollow space or may be filled with insulative material or may be used to accommodate electronic components and/or wiring.

In the device 5*c*, the cartridge 30 is adapted to contain a bio-safe lubricant 35. The lubricant 35 may be a drug in the form of a cream, gel, or other fluid of suitable viscosity and may be loaded into the cartridge 30 using a syringe or other inserter mechanism. In an example, the cartridge 30 may be reusable such that the lubricant 35 may be reloaded therein as-needed. In another example, the cartridge 30 may be disposable once the lubricant 35 is exhausted from therein. Moreover, the lubricant 35 is adapted to fill the cartridge 30 and may or may not be pressurized. Additionally, the lubricant 35 may comprise any type of lubricant that may be used for dermatological and/or other medical uses as well as non-medical uses. In an example, to ensure a lack of contamination, the cartridge 30 is configured to be sealed to prevent the lubricant 35 from escaping therefrom except from a suitable egress port 31. According to an example, the egress port 31, as identified in FIG. 3(C), may be configured to actuate between an opened position (to allow the lubricant to dispense from the cartridge 30) and closed position (to retain the lubricant 35 in the cartridge 30).

The device 5*c* further comprises an applicator head 40 attached to the front wall 62 of the first portion 20 of the housing 15 such that the applicator head 40 is aligned with the housing 15 and positioned at the tip (e.g., the front end 2 that is adjacent to the first portion 20 and away from the second portion 25) of the housing 15. In an example, the applicator head 40 comprises a smooth surface 45 devoid of abrasive particles and bristles. The head 40 may be substantially bulbous in shape although other shapes and configurations are possible. As such, the head 40 may be contoured to any suitable shape which provides comfort and ease when pressed and rotated against a user's skin. The head 40 may be made of plastic, rubber, silicone, a composite, or glass, or a combination thereof. Moreover, the head 40 may be detachably connected to the front wall 62 of the first portion of the housing 15 to facilitate changing between different heads and/or ease of cleaning or disinfection of the head 40, as necessary.

The device 5*c* further comprises a nozzle 50 operatively connected and aligned to the egress port 31 of the cartridge 30 and extending through the applicator head 40. The nozzle 50 is to discharge the lubricant 35 out from the applicator head 40. There may be a RFID component (e.g., one or more sensors 44 . . . 44*x* (of FIG. 6)) inside the nozzle 50 which may indicate how much lubricant 35 to dispense per instance that a button (e.g., buttons 19) on the handle 10 of the device 5*c* is pushed. Furthermore, the nozzle 50 may be configured in different sizes such that a larger sized nozzle 50 may discharge a greater amount of lubricant 35 compared with a smaller sized nozzle 50.

The head 40 of device 5*c* may be configured in a narrow, small, moderate, or large configuration, among other sizes and configurations. In an example, the narrow configuration may comprise an approximately 12 mm circumference of the head 40 with an opening of the nozzle 50 of approximately 3 mm. In an example, the small configuration may comprise an approximately 18 mm circumference of the head 40 with an opening of the nozzle 50 of approximately 4-5 mm. In an example, the moderate configuration may comprise an approximately 26 mm circumference of the head 40 with an opening of the nozzle 50 of approximately 5-6 mm. In an example, the large configuration may comprise an approximately 36 mm circumference of the head 40 with an opening of the nozzle 50 of approximately 6+ mm. The above dimensions are merely examples, and the embodiments herein are not restricted to these particular dimensions and configurations. The narrow configuration may correspond with a relatively slow rate of discharge of the lubricant 35 from the nozzle 50. The small configuration may correspond with a relatively mild rate of discharge of the lubricant 35 from the nozzle 50. The moderate configuration may correspond with a relatively moderate rate of discharge of the lubricant 35 from the nozzle 50. The large configuration may correspond with a relatively heavy rate of discharge of the lubricant 35 from the nozzle 50.

The device 5*c* further comprises a rod 55 in the cartridge 30. The rod 55 may comprise an elongated longitudinal member and may be configured as a shaft, screw, or any other advancement mechanism. The rod 55 may comprise a length that is substantially the same or similar to the length of the cartridge 30 as the rod 55 extends from one end of the cartridge 30 to the longitudinally opposing end thereof. The rod 55 may be held in place by any suitable retaining mechanism such as pins, screws, nails, brackets, adhesives, or may be engaged to another structural component in or on the cartridge 30 to retain the rod 55 in place without slipping or become dislodged or disengaged.

The device 5*c* further comprises a plate 60 connected to the rod 55 and positioned in the cartridge 30. The plate 60 may comprise any of a substantially disk configuration, angled configuration, symmetrical configuration, and eccentric configuration, etc., according to various examples. In an example, the plate 60 may be configured as a plunger or piston. As shown in FIG. 5, the rod 55 may comprise threads 80 that engage complementary threads 85 of the plate 60, according to an example to permit the rod 55 to rotationally actuate the plate 60. In use, the lubricant 35 is loaded or pre-loaded into the cartridge 30 and rotation of the rod 55 causes translation of the plate 60 in a direction towards the egress port 31 of the cartridge 30 (e.g., from the second portion 25 towards the first portion 20 of the housing 15), which causes the lubricant 35 to be transferred from the cartridge 30 through the egress port 31. The nozzle 50 may extend and align/attach to the egress port 31 to permit the lubricant 35 to move to the nozzle 50. The interface of the egress port 31 and nozzle 50 may be suitably sealed to prevent the lubricant 35 from escaping into the first portion 20 of the housing 15 and causing leakage as well as preventing contamination of other components of the device 5*c*. Movement of the lubricant 35 through the nozzle 50 continues out through the opening or hole of the nozzle 50 where the nozzle 50 terminates at the head 40 for application of the lubricant 35 onto a user's skin, etc.

The device 5*c* further comprises a first motor 65 in the first portion 20 of the housing 15. According to an example, the first motor 65 may be attached to the front wall 62 of the first portion 20 of the housing 15. The first motor 65 is to drive motion of the applicator head 40. In some examples, the motion of the applicator head 40 may comprise any of a swivel motion, rotation motion, vibration motion, or a combination thereof. In an example, the head 40 may move, rotate, etc. in variable speeds and at variable revolution angles according to a user's command as input through the buttons 19 or through other input mechanisms including voice command. Additionally, the first motor 65 may be a stepper motor, according to an example, and may be a variable speed motor offering both clockwise and counter-clockwise revolution motion and may also have vibrational effects. The first motor 65 may be waterproofed using a suitable sealing mechanism and/or structure.

The device 5*c* further comprises a second motor 70 operatively connected to the rod 55. In an example, the second motor 70 is to drive motion of the rod 55 in the cartridge 30. Moreover, the rod 55 is to drive motion of the plate 60 in the cartridge 30. The second motor 70 is to drive motion of the actuation of dispensing of the lubricant 35 in the cartridge 30. Additionally, the second motor 70 may be a stepper motor, according to an example, and may be a variable speed motor offering both clockwise and counter-clockwise revolution motion and may also have vibrational effects. The second motor 70 may be waterproofed using a suitable sealer, sealing mechanism and/or structure.

The device 5*c* may comprise a collar 90 surrounding the nozzle 50 in the first portion 20 of the housing 15 or in the applicator head 40 or a combination thereof. The collar 90 may be an elongated structure such as a tube that contains the nozzle 50. As such, the first motor 65 may contain a hollow center to accommodate the nozzle 50. Moreover, the first motor 65 may be fixably attached to the front wall 62. As shown in FIG. 3(D), the nozzle 50 extends through the first motor 65 for extension through the head 40. Furthermore, the first motor 65 may attach to both the front wall 62 and the wall 73 that separates the first portion 20 from the second portion 25 of the housing 15. While not shown in FIGS. 3(A) through 3(H), the first motor 65 of device 5*c* may comprise internal actuation components such as a first gear 95 and first pinion 100 that perform the actuation functions to drive the motion of the head 40 in a manner similar to that as described above with respect to devices 5*a*, 5*b* of FIGS. 1(A) through 2(I).

The first motor 65 (including any internal actuation components such as a first gear 95 and a first pinion 100) is operatively connected to the collar 90. Moreover, the first motor 65 may be fixably connected to the collar 90 through the front wall 62 such that the collar 90 may extend through the front wall 62 to contact the first motor 65. Additionally, according to an example, rotational movement provided by the first motor 65 (including any internal components such as a first gear 95) causes a corresponding rotational movement of the collar 90, which causes a corresponding rotational movement of the head 40.

The device 5*c* may comprise a second gear 105 operatively connected to the rod 55, and a second pinion 110 operatively connecting the second motor 70 to the second gear 105. The second gear 105 may be any suitably sized gear containing any suitable number of teeth. Furthermore, the second pinion 110 may be any suitably sized pinion containing any suitable number of teeth. The second motor 70 may drive motion of the second pinion 110 such that the motion of the second pinion 110 may drive motion of the second gear 105, and the rotation of the second gear 105 may rotate the rod 55. Thereafter, the rotation of the rod 55 may translate the plate 60 within the cartridge 30 as the plate 60 is able to translate with respect to the rod 55 due to the complementary threads 80, 85, of the rod 55 and plate 60, respectively. Accordingly, the translation of the plate 60 in the cartridge 30 pushes the lubricant 35 in the cartridge 30, out through the egress port 31, in the nozzle 50, and then onto the head 40. In an example, the rod 55 may comprise a rod gear 56 (shown in FIG. 5) to engage the second gear 105.

In device 5*c*, the first motor 65 including any internal gears and pinions (such as first gear 95 or first pinion 100) and the second gear 105 do not engage with one another or drive one another or connect or contact with each other. Similarly, the first motor 65 including any internal gears and pinions (such as first gear 95 or first pinion 100) and the second pinion 110 do not engage with one another or drive one another or connect or contact with each other. Similarly, the first motor 65 including any internal gears and pinions (such as first gear 95 or first pinion 100) and the second pinion 110 do not engage with one another or drive one another or connect or contact with each other. Similarly, the second gear 105 and the first motor 65 including any internal gears and pinions (such as first gear 95 or first pinion 100) do not engage with one another or drive one another or connect or contact with each other.

Figure 3C:
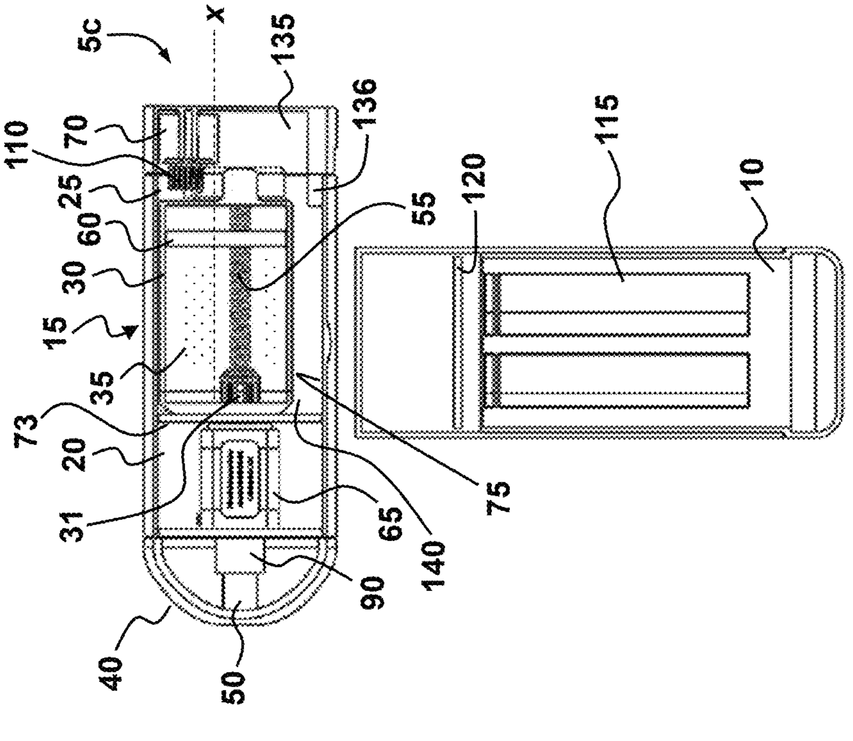
FIG. 3(C) is a first cross-sectional view illustrating the lubricant dispensing buffing device of FIG. 3(A), according to a third embodiment herein.
Figure 3F:
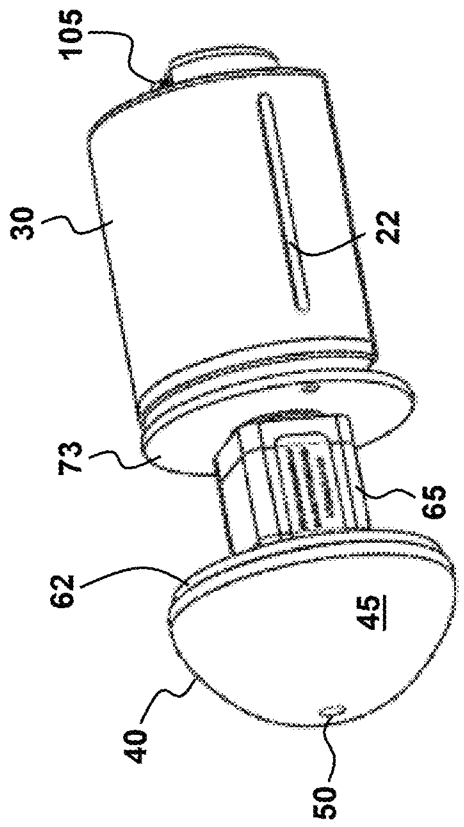
FIG. 3(F) is a second isolated view illustrating the front end and cartridge of the lubricant dispensing buffing device of FIG. 3(A), according to a third embodiment herein.
Figure 3E:
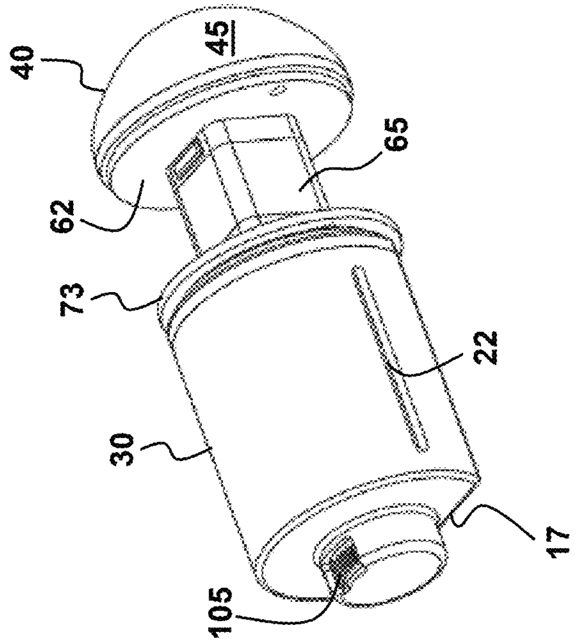
FIG. 3(E) is a first isolated view illustrating the front end and cartridge of the lubricant dispensing buffing device of FIG. 3(A), according to a third embodiment herein.
Figure 3H:
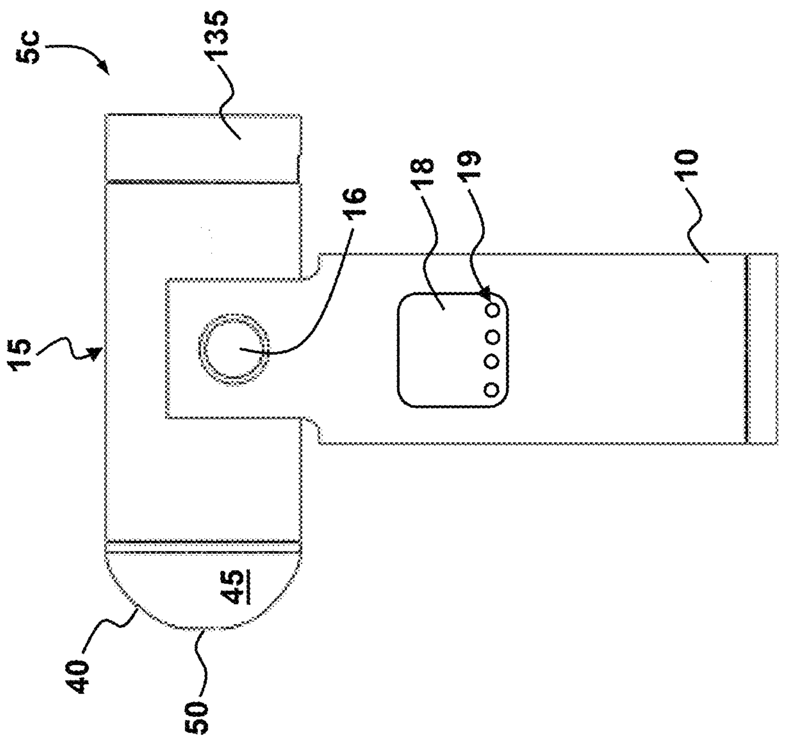
FIG. 3(H) is a side view illustrating the lubricant dispensing buffing device of FIG. 3(A), according to a third embodiment herein.
Figure 3G:
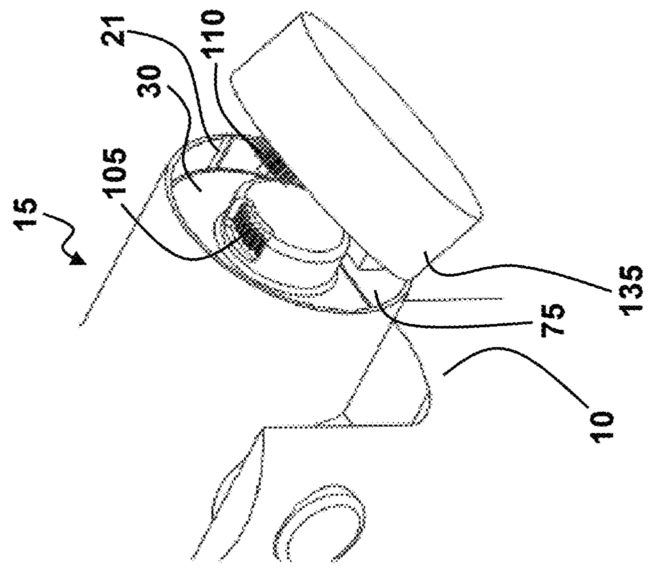
FIG. 3(G) is an isolated view illustrating the rear end of the lubricant dispensing buffing device of FIG. 3(A), according to a third embodiment herein.

As shown in FIGS. 3(C), 3(D), and 3(F), the first motor 65 may surround the nozzle 50 in the first portion 20 of the housing 15. Moreover, as shown in FIGS. 3(C) and 3(D), the rod 55 may be positioned offset to a central longitudinal axis x of the cartridge 30. This is due to the eccentric (i.e., not exclusively cylindrical) shape of the cartridge 30 to accommodate a corresponding eccentric shaped plate 60 in FIGS. 3(A) through 3(H).

The housing 15 may further comprise a third portion 135 adjacent to the second portion 25 and at the rear end 3 of device 5*c*. The third portion 135 may serve as a rear cap to close the open second portion 25 of the housing 15. The third portion 135 may be configured in a substantially hollow open cylinder configuration such that the open end of the third portion 135 aligns with the open end of the second portion 25 of the housing 15. According to an example, the third portion 135 is configured to be smaller in size (i.e., length) than any of the first portion 20 and the second portion 25, respectively, although the embodiments herein may include examples where the third portion 135 and any of the first portion 20 and the second portion 25 comprise a substantially similar size as each other including examples where the sizes of the first portion, second portion 25, and third portion 135 are substantially the same as each other. In an example where the housing 15 comprises a substantially cylindrical shape, the respective diameters of the first portion 20, the second portion 25, and the third portion 135 are the same or are substantially the same.

In an example, the third portion 135 may be pivotally connected to the second portion 25. The pivotal connection of the third portion 135 may occur using a hinge 136 or other suitable pivot mechanism. In an example, the hinge 136 may provide a suitable locking feature when the third portion 135 is closed against the second portion 25 of the housing 15. Moreover, the third portion 135 may be opened by rotating the third portion 135 about the hinge 136, and moreover, in an example, the actuation of the opening of the third portion 135 may occur through a push-action technique whereby pushing the third portion 135 against the housing 15 when the third portion 135 is closed may cause the hinge 136 to create a rotational force and open the third portion 135. The cartridge 30 may be removably detachable from the housing 15 through the open-ended second portion 25 by way of opening the third portion 135 of the housing 15. In this regard, the cartridge 30 may be reloaded into the second portion 25 by opening the third portion 135 and inserting the cartridge 30 into the second portion 25 of the housing 15. As described above, the cartridge 30 may slide into the second portion 25 of the housing 15 using the interaction of the tracks 21 and guides 22. Once the cartridge 30 is seated in the second portion 25 of the housing 15, the third portion 135 may be rotated/pushed onto the housing 15 to close the second portion 25 of the housing 15.

While the second motor 70 may be positioned in any of the first portion 20, the second portion 25, and the third portion 135 of the housing 15, in the examples shown in FIGS. 3(A) through 3(H), the second motor 70 is positioned in the third portion 135 of the housing 15. When the third portion 135 of the housing 15 is closed, the second pinion 110 operatively connected to the second motor 70 aligns and engages the second gear 105. As described above, upon actuation of the second motor 70, the second pinion 110 actuates, causing the second gear 105 to actuate, causing the rod 55 to actuate, causing the plate 60 to translate, causing the lubricant 35 to be pushed by the plate 60 in the cartridge 30 and through the egress port 31 and into the nozzle 50, and out onto the head 40.

The device 5*c* may further comprise a power source 115 in the handle 10, and an electronic circuit board 120 in the handle 10 that is electrically connected to the display screen 18, power source 115, the first motor 65, and the second motor 70. In an example, the electrical connection between the electronic circuit board 120 in the handle 10 to the first motor 65 and the second motor 70 may occur through the rotational member 16 that attaches the handle 10 to the housing 15. In the housing 15, electrical traces/wires 101 may be appropriately arranged to provide electrical connections to the first motor 65 and the second motor 70. In another example, the first motor 65 and the second motor 70 may each comprise RFID components (e.g., one or more sensors 44 . . . 44*x*) to provide wireless communication 102 with the electronic circuit board 120. In an example, the power source 115 may be a DC electric power source, although other types of power sources are possible in accordance with the embodiments herein. The power source 115 may comprise one or more batteries, which may be disposable and/or rechargeable. Furthermore, the power source 115 may comprise multiple cells of lithium-ion batteries, such as 18650 Li-ion batteries, according to an example.

In some examples, as shown in FIG. 6, the electronic circuit board 120 may comprise a microchip 36 and transceiver 37 among other microelectronic and/or circuit board components 38 . . . 38*x* (e.g., memory, other processors, etc.). The power source 115 is connected to the electronic circuit board 120 and the display screen 18. The transceiver 37 permits wired and/or wireless communication 103 to a remote device 200 that is communicatively coupled to the device 5*c*. In some examples, the remote device 200 may comprise any of a smartphone, tablet device, laptop, computer, server, or any other electronic communication device including smart appliances such as a television, smart speaker, or electronic virtual assistant devices. The buttons 19 of the display screen 18 and/or of the handle 10 and/or the remote device 200 may be used to transmit instructions through the microchip 36 of the electronic circuit board 120 for operation of the device 5*c* including actuation of the first motor 65 and second motor 70.

Figure 4B:
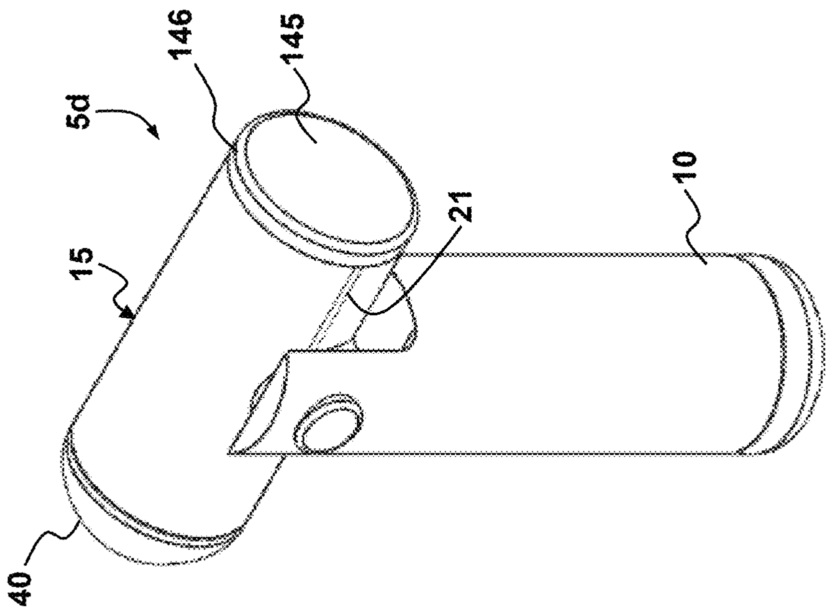
FIG. 4(B) is a rear perspective view illustrating the lubricant dispensing buffing device of FIG. 4(A), according to a fourth embodiment herein.
Figure 4A:
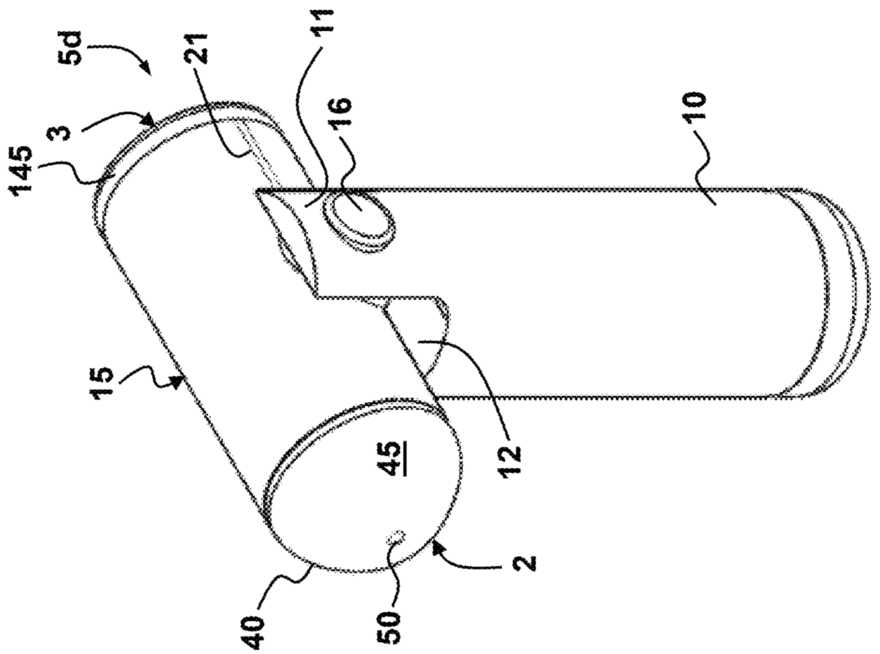
FIG. 4(A) is a front perspective view illustrating a lubricant dispensing buffing device, according to a fourth embodiment herein.

FIGS. 4(A) through 4(H) illustrate a hand-held lubricant dispensing buffing device 5*d*, according to a second embodiment herein. As shown in FIG. 4(A), the device 5*d* comprises a front end 2 and a rear end 3. The device 5*d* comprises a handle 10. The handle 10 may house various components such as microelectronics, batteries, as well as connecting mechanisms, among other components, as further described below. The handle 10 may be substantially elongated and dimensioned and configured to have a contoured shape to be easily held by a user. The handle 10 may comprise a LCD or LED illuminated display screen 18. For ease of view, the display screen 18 is only shown on the device 5*d* in FIG. 4(H). However, it is to be understood that the display screen 18 may be part of the handle 10 as provided in all of the other corresponding figures illustrating device 5*d*. Moreover, additional user buttons 19 may be configured on the display screen 18 as touch-enabled GUI buttons and/or the user buttons 19 may be positioned on the handle 10 itself as toggle or press-enabled buttons or a combination thereof. The display screen 18 and user buttons 19 may be positioned anywhere on the handle 10. The handle 10 may be configured to fit on a docking station or receptacle 150 (shown in FIG. 6), which may engage the device 5*d* at or near the base or bottom of the handle 10. The docking station or receptacle 150 may be utilized as a stand for the device 5*d* and/or power source, adapter, or charger for the device 5*d*, among other uses.

The device 5*d* further comprises a housing 15 operatively connected to the handle 10. In an example, the handle 10 may be pivotally connected to the housing 15. More specifically, the handle 10 may pivotally or rotationally attach to the housing 15 through a rotational member 16 such as a pin, dowel, screw, or any other suitable rotational member. In another example, the handle 10 and the housing 15 may detachably connect to each other. In an example, the rotational member 16 may permit the housing 15 to lock to the handle 10 and upon rotation of the housing 15 with respect to the handle 10, the rotational member 16 may comprise a series of locking positions to permit the housing 15 to be locked in various angular positions with respect to the handle 10. The housing 15 may comprise a substantially elongated configuration having a substantially cylindrical shape, although other shapes and configurations are possible in accordance with the embodiments herein.

Figure 4D:
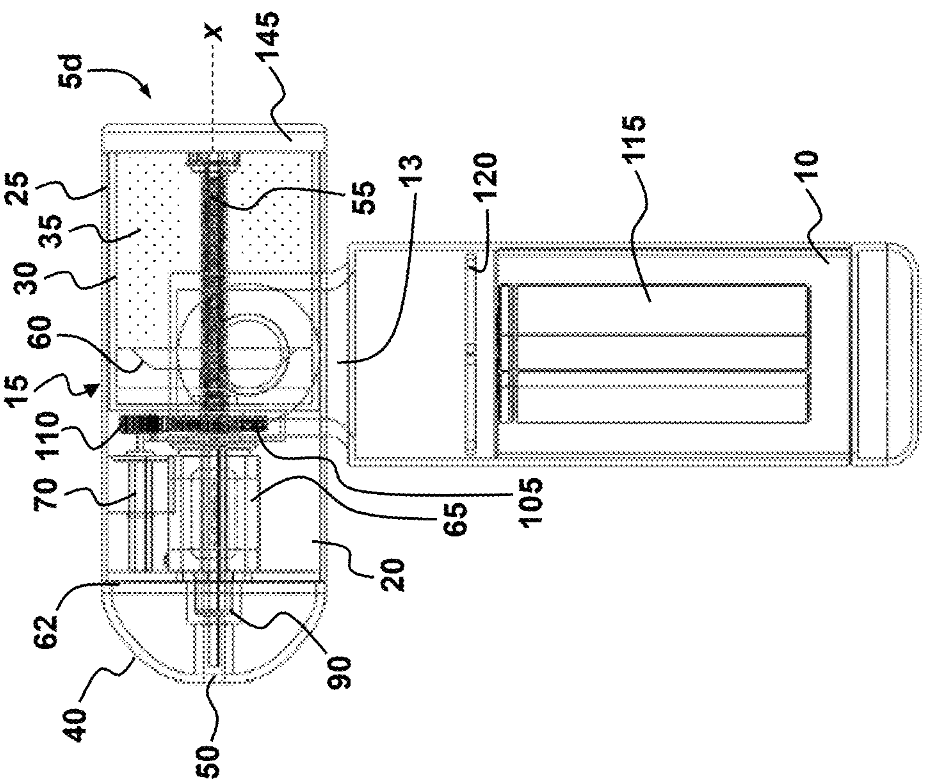
FIG. 4(D) is a second cross-sectional view illustrating the lubricant dispensing buffing device of FIG. 4(A), according to a fourth embodiment herein.

The handle 10 may comprise one or more upper arms 11 with a recessed seat 12 positioned adjacent to the one or more upper arms 11. In an example with a pair of arms 11, the rotational member 16 may be positioned in each upper arm 11 such that there may be a separate rotational member 16 for each arm 11 for connection to the housing 15. In an example with a pair of arms 11, the spacing between the upper arms 11 defines the width of the recessed seat 12 and is configured to accommodate the width of the housing 15. A gap 13 as further identified in FIG. 4(D) is provided between the seat 12 and the housing 15 to permit the housing 15 to have clearance for rotation about the rotational member 16 with respect to the handle 10.

The housing 15 comprises a first portion 20 and a second portion 25. The first portion 20 and the second portion 25 may be connected together such that the housing 15 contains both the first portion 20 and the second portion 25. The device 5*d* may comprise a front wall 62 on the first portion 20 of the housing 15. Moreover, in an example, the device 5*d* may comprise a wall 73 in the housing 15 that separates the first portion 20 from the second portion 25 as shown in FIG. 4(F). The first portion 20 and the second portion 25 may be defined as internal chambers of the housing 15 to house additional components, as further described below. The second portion 25 is configured to be larger in size than the first portion 20, although the embodiments herein may include examples where the first portion 20 and the second portion 25 comprise a substantially similar size as each other. In an example where the housing 15 comprises a substantially cylindrical shape, the respective diameters of the first portion 20 and the second portion 25 are the same or are substantially the same. In an example, the handle 10 is configured to attach to the housing 15 adjacent to the second portion 25, although other examples permit the attachment of the handle 10 to the housing 15 to occur at the first portion 20. In an unpivoted arrangement, the handle 10 and housing 15 may form a substantially “T” shape such that the handle 10 and housing 15 are transversely positioned with respect to each other, although other shapes are possible, and the embodiments herein are not restricted to a particular shape and/or configuration. According to the second embodiment of the device 5*d* shown in FIGS. 4(A) through 4(H), the handle 10 and the housing 15 may comprise substantially equal lengths. The housing 15 may further comprise one or more tracks 21 that may be positioned external to the housing 15 and on the second portion 25 as identified in FIGS. 4(A) and 4(B). While not shown in FIGS. 4(A) and 4(B), an internal wall of the second portion 25 of the housing 15 may also comprise one or more tracks 21. The one or more tracks 21 may be configured as rails, grooves, or any other type of suitable track structures.

The device 5*d* further comprises a cartridge 30 positioned inside the second portion 25 of the housing 15. As such, the cartridge 30 is adapted to fit in the second portion 25 of the housing 15 and is configured to be slightly smaller in length, width, and height compared to the second portion 25 of the housing 15 such that the cartridge 30 snugly fits in the second portion 25 of the housing 15, but such that the cartridge 30 can be removably detached from the second portion 25 of the housing 15. In such an example, there is no significant gap or spacing between the cartridge 30 and the inside of the second portion 25 of the housing 15. In an example, the cartridge 30 may comprise a substantially elongated tube or cylindrical configuration. In an example, the cartridge 30 may comprise a substantially smooth outer surface 32 as shown in FIG. 4(E). According to an example, the one or more tracks 21 of the housing 15 may be indented such that the tracks 21 protrude into the second portion 25 of the housing 15 in order to more snugly engage the cartridge 30 of device 5*d*. In such an example, engagement of the tracks 21 against the cartridge 30 allows for proper seating of the cartridge 30 in the housing 15 and to reduce vibration and movement of the cartridge 30 in the housing 15.

In the device 5*d*, the cartridge 30 is adapted to contain a bio-safe lubricant 35. The lubricant 35 may be a drug in the form of a cream, gel, or other fluid of suitable viscosity and may be loaded into the cartridge 30 using a syringe or other inserter mechanism. In an example, the cartridge 30 may be reusable such that the lubricant 35 may be reloaded therein as-needed. In another example, the cartridge 30 may be disposable once the lubricant 35 is exhausted from therein. Moreover, the lubricant 35 is adapted to fill the cartridge 30 and may or may not be pressurized. Additionally, the lubricant 35 may comprise any type of lubricant that may be used for dermatological and/or other medical uses as well as non-medical uses. In an example, to ensure a lack of contamination, the cartridge 30 is configured to be sealed to prevent the lubricant 35 from escaping therefrom except from a suitable egress port 31. According to an example, the egress port 31, as identified in FIG. 4(C), may be configured to actuate between an opened position (to allow the lubricant to dispense from the cartridge 30) and closed position (to retain the lubricant 35 in the cartridge 30).

The device 5*d* further comprises an applicator head 40 attached to the front wall 62 of the first portion 20 of the housing 15 such that the applicator head 40 is aligned with the housing 15 and positioned at the tip (e.g., the front end 2 that is adjacent to the first portion 20 and away from the second portion 25) of the housing 15. In an example, the applicator head 40 comprises a smooth surface 45 devoid of abrasive particles and bristles. The head 40 may be substantially bulbous in shape although other shapes and configurations are possible. As such, the head 40 may be contoured to any suitable shape which provides comfort and ease when pressed and rotated against a user's skin. The head 40 may be made of plastic, rubber, silicone, a composite, or glass, or a combination thereof. Moreover, the head 40 may be detachably connected to the front wall 62 of the first portion of the housing 15 to facilitate changing between different heads and/or ease of cleaning or disinfection of the head 40, as necessary.

The device 5*d* further comprises a nozzle 50 operatively connected and aligned to the egress port 31 of the cartridge 30 and extending through the applicator head 40. The nozzle 50 is to discharge the lubricant 35 out from the applicator head 40. There may be a RFID component (e.g., one or more sensors 44 . . . 44*x* (of FIG. 6)) inside the nozzle 50 which may indicate how much lubricant 35 to dispense per instance that a button (e.g., buttons 19) on the handle 10 of the device 5*d* is pushed. Furthermore, the nozzle 50 may be configured in different sizes such that a larger sized nozzle 50 may discharge a greater amount of lubricant 35 compared with a smaller sized nozzle 50.

The head 40 of device 5*d* may be configured in a narrow, small, moderate, or large configuration, among other sizes and configurations. In an example, the narrow configuration may comprise an approximately 12 mm circumference of the head 40 with an opening of the nozzle 50 of approximately 3 mm. In an example, the small configuration may comprise an approximately 18 mm circumference of the head 40 with an opening of the nozzle 50 of approximately 4-5 mm. In an example, the moderate configuration may comprise an approximately 26 mm circumference of the head 40 with an opening of the nozzle 50 of approximately 5-6 mm. In an example, the large configuration may comprise an approximately 36 mm circumference of the head 40 with an opening of the nozzle 50 of approximately 6+ mm. The above dimensions are merely examples, and the embodiments herein are not restricted to these particular dimensions and configurations. The narrow configuration may correspond with a relatively slow rate of discharge of the lubricant 35 from the nozzle 50. The small configuration may correspond with a relatively mild rate of discharge of the lubricant 35 from the nozzle 50. The moderate configuration may correspond with a relatively moderate rate of discharge of the lubricant 35 from the nozzle 50. The large configuration may correspond with a relatively heavy rate of discharge of the lubricant 35 from the nozzle 50.

The device 5*d* further comprises a rod 55 in the cartridge 30. The rod 55 may comprise an elongated longitudinal member and may be configured as a shaft, screw, or any other advancement mechanism. The rod 55 may comprise a length that is substantially the same or similar to the length of the cartridge 30 as the rod 55 extends from one end of the cartridge 30 to the longitudinally opposing end thereof. The rod 55 may be held in place by any suitable retaining mechanism such as pins, screws, nails, brackets, adhesives, or may be engaged to another structural component in or on the cartridge 30 to retain the rod 55 in place without slipping or become dislodged or disengaged.

The device 5*d* further comprises a plate 60 connected to the rod 55 and positioned in the cartridge 30. The plate 60 may comprise any of a substantially disk configuration, angled configuration, symmetrical configuration, and eccentric configuration, etc., according to various examples. In an example, the plate 60 may be configured as a plunger or piston. As shown in FIG. 5, the rod 55 may comprise threads 80 that engage complementary threads 85 of the plate 60, according to an example to permit the rod 55 to rotationally actuate the plate 60. In use, the lubricant 35 is loaded or pre-loaded into the cartridge 30 and rotation of the rod 55 causes translation of the plate 60 in a direction towards the egress port 31 of the cartridge 30 (e.g., from the second portion 25 towards the first portion 20 of the housing 15), which causes the lubricant 35 to be transferred from the cartridge 30 through the egress port 31. The nozzle 50 may extend and align/attach to the egress port 31 to permit the lubricant 35 to move to the nozzle 50. The interface of the egress port 31 and nozzle 50 may be suitably sealed to prevent the lubricant 35 from escaping into the first portion 20 of the housing 15 and causing leakage as well as preventing contamination of other components of the device 5*d*. Movement of the lubricant 35 through the nozzle 50 continues out through the opening or hole of the nozzle 50 where the nozzle 50 terminates at the head 40 for application of the lubricant 35 onto a user's skin, etc.

The device 5*d* further comprises a first motor 65 in the first portion 20 of the housing 15. According to an example, the first motor 65 may be attached to the front wall 62 of the first portion 20 of the housing 15. The first motor 65 is to drive motion of the applicator head 40. In some examples, the motion of the applicator head 40 may comprise any of a swivel motion, rotation motion, vibration motion, or a combination thereof. In an example, the head 40 may move, rotate, etc. in variable speeds and at variable revolution angles according to a user's command as input through the buttons 19 or through other input mechanisms including voice command. Additionally, the first motor 65 may be a stepper motor, according to an example, and may be a variable speed motor offering both clockwise and counter-clockwise revolution motion and may also have vibrational effects. The first motor 65 may be waterproofed using a suitable sealing mechanism and/or structure.

The device 5*d* further comprises a second motor 70 operatively connected to the rod 55. In an example, the second motor 70 is to drive motion of the rod 55 in the cartridge 30. Moreover, the rod 55 is to drive motion of the plate 60 in the cartridge 30. The second motor 70 is to drive motion of the actuation of dispensing of the lubricant 35 in the cartridge 30. Additionally, the second motor 70 may be a stepper motor, according to an example, and may be a variable speed motor offering both clockwise and counter-clockwise revolution motion and may also have vibrational effects. The second motor 70 may be waterproofed using a suitable sealer, sealing mechanism and/or structure.

The device 5*d* may comprise a collar 90 surrounding the nozzle 50 in the first portion 20 of the housing 15 or in the applicator head 40 or a combination thereof. The collar 90 may be an elongated structure such as a tube that contains the nozzle 50. As such, the first motor 65 may contain a hollow center to accommodate the nozzle 50. Moreover, the first motor 65 may be fixably attached to the front wall 62. As shown in FIGS. 4(F) and 4(G), the nozzle 50 extends through the first motor 65 for extension through the head 40. Furthermore, the first motor 65 may attach to both the front wall 62 and the wall 73 that separates the first portion 20 from the second portion 25 of the housing 15. While not shown in FIGS. 4(A) through 4(H), the first motor 65 of device 5*d* may comprise internal actuation components such as a first gear 95 and first pinion 100 that perform the actuation functions to drive the motion of the head 40 in a manner similar to that as described above with respect to devices 5*a*, 5*b* of FIGS. 1(A) through 2(I).

The first motor 65 (including any internal actuation components such as a first gear 95 and a first pinion 100) is operatively connected to the collar 90. Moreover, the first motor 65 may be fixably connected to the collar 90 through the front wall 62 such that the collar 90 may extend through the front wall 62 to contact the first motor 65. Additionally, according to an example, rotational movement provided by the first motor 65 (including any internal components such as a first gear 95) causes a corresponding rotational movement of the collar 90, which causes a corresponding rotational movement of the head 40.

The device 5*d* may comprise a second gear 105 operatively connected to the rod 55, and a second pinion 110 operatively connecting the second motor 70 to the second gear 105. The second gear 105 may be any suitably sized gear containing any suitable number of teeth. Furthermore, the second pinion 110 may be any suitably sized pinion containing any suitable number of teeth. The second motor 70 may drive motion of the second pinion 110 such that the motion of the second pinion 110 may drive motion of the second gear 105, and the rotation of the second gear 105 may rotate the rod 55. Thereafter, the rotation of the rod 55 may translate the plate 60 within the cartridge 30 as the plate 60 is able to translate with respect to the rod 55 due to the complementary threads 80, 85, of the rod 55 and plate 60, respectively. Accordingly, the translation of the plate 60 in the cartridge 30 pushes the lubricant 35 in the cartridge 30, out through the egress port 31, in the nozzle 50, and then onto the head 40. In an example, the rod 55 may comprise a rod gear 56 (shown in FIG. 5) to engage the second gear 105.

In device 5*d*, the first motor 65 including any internal gears and pinions (such as first gear 95 or first pinion 100) and the second gear 105 do not engage with one another or drive one another or connect or contact with each other. Similarly, the first motor 65 including any internal gears and pinions (such as first gear 95 or first pinion 100) and the second pinion 110 do not engage with one another or drive one another or connect or contact with each other. Similarly, the first motor 65 including any internal gears and pinions (such as first gear 95 or first pinion 100) and the second pinion 110 do not engage with one another or drive one another or connect or contact with each other. Similarly, the second gear 105 and the first motor 65 including any internal gears and pinions (such as first gear 95 or first pinion 100) do not engage with one another or drive one another or connect or contact with each other.

Figure 4C:
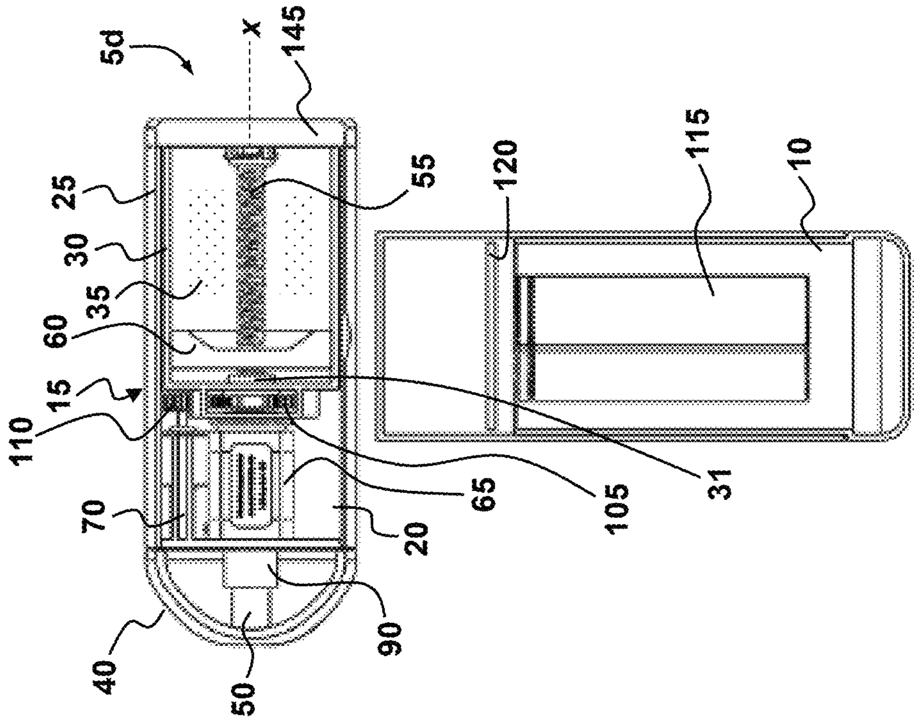
FIG. 4(C) is a first cross-sectional view illustrating the lubricant dispensing buffing device of FIG. 4(A), according to a fourth embodiment herein.
Figure 4F:
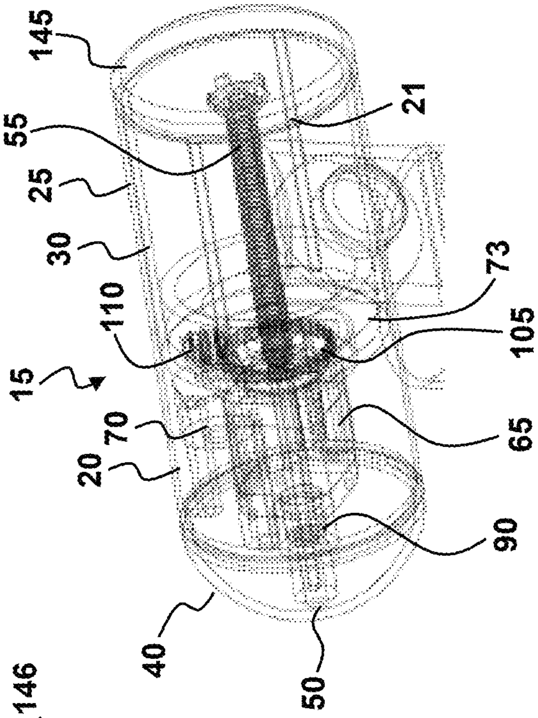
FIG. 4(F) is an isolated transparent view illustrating the front end and cartridge of the lubricant dispensing buffing device of FIG. 4(A), according to a fourth embodiment herein.
Figure 4E:
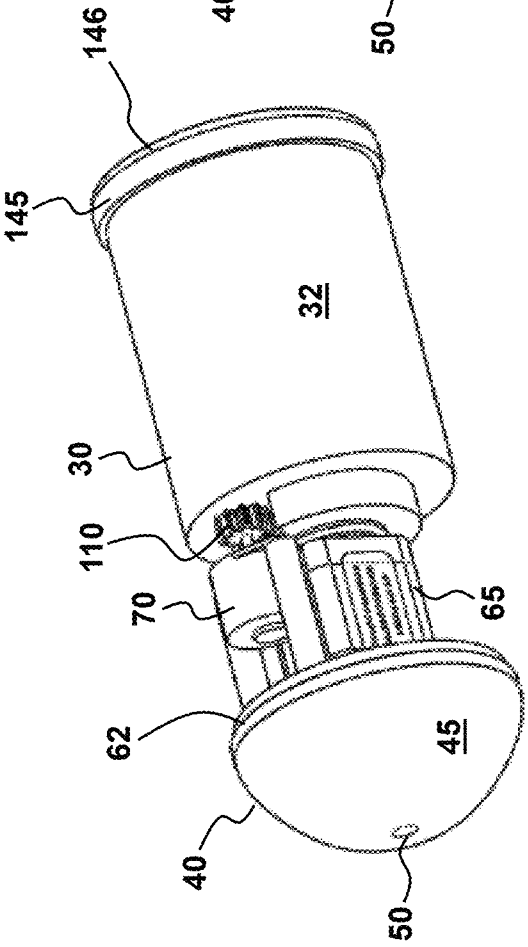
FIG. 4(E) is an isolated view illustrating the front end and cartridge of the lubricant dispensing buffing device of FIG. 4(A), according to a fourth embodiment herein.
Figure 4H:
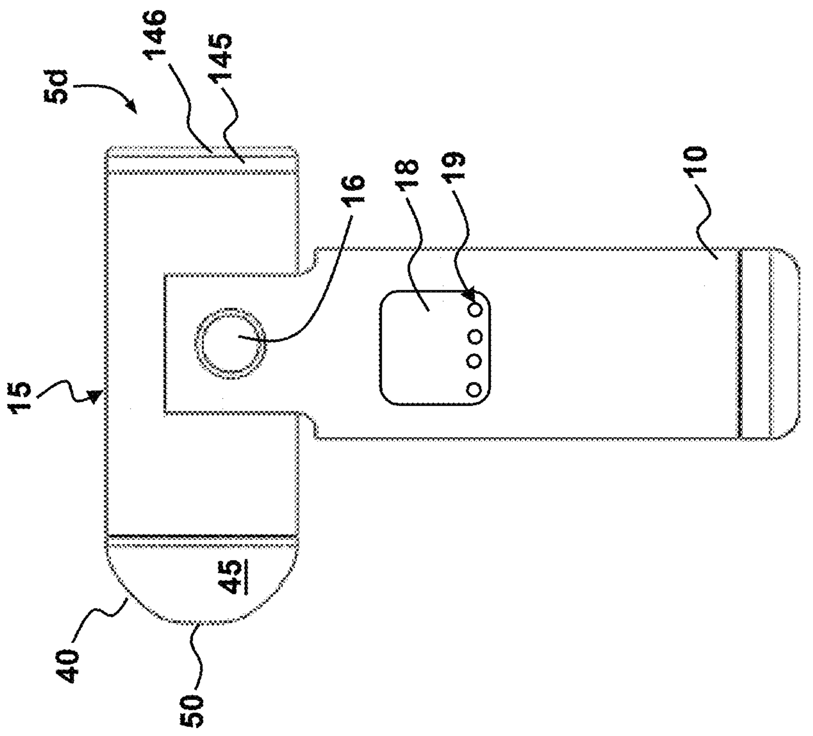
FIG. 4(H) is a side view illustrating the lubricant dispensing buffing device of FIG. 4(A), according to a fourth embodiment herein.
Figure 4G:
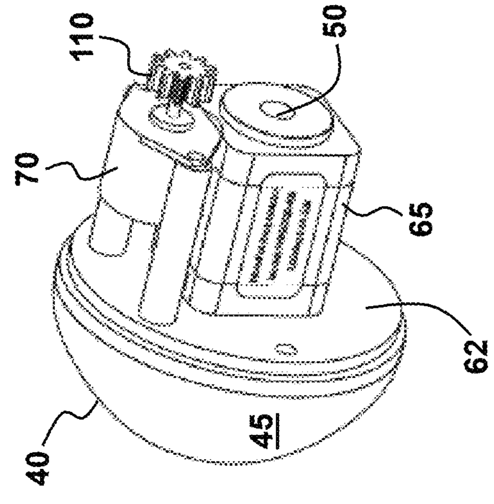
FIG. 4(G) is an isolated view illustrating the front end of the lubricant dispensing buffing device of FIG. 4(A), according to a fourth embodiment herein.

As shown in FIGS. 4(C) through 4(G), the first motor 65 may surround the nozzle 50 in the first portion 20 of the housing 15. Furthermore, the first motor 65 may be adjacent to the second motor 70. Moreover, as shown in FIGS. 4(C) and 4(D), the rod 55 may be positioned along a central longitudinal axis x of the cartridge 30. This is due to the substantially cylindrical shape of the cartridge 30.

The housing 15 may further comprise an end cap 145 adjacent to the second portion 25 and at the rear end 3 of device 5*d*. The end cap 145 may serve as a rear cap to close the open second portion 25 of the housing 15. The end cap 145 may be configured as a push on, twist on, or other suitable type of cap such that the end cap 145 aligns with the open end of the second portion 25 of the housing 15. According to an example, the end cap 145 is configured to be smaller in size (i.e., length) than any of the first portion 20 and the second portion 25, respectively, although the embodiments herein may include examples where the end cap 145 and any of the first portion 20 and the second portion 25 comprise a substantially similar size as each other including examples where the sizes of the first portion, second portion 25, and end cap 145 are substantially the same as each other. In an example where the housing 15 comprises a substantially cylindrical shape, the respective diameters of the first portion 20, the second portion 25, and the end cap 145 are the same or are substantially the same.

Additionally, as shown in FIGS. 4(A) through 4(H), the diameter of the end cap 145 is larger than the diameter of the cartridge 30. According to an example, as shown in FIGS. 4(B), 4(E), and 4(H), the end cap 145 may have a lip 146, which may help to facilitate engagement and disengagement of the end cap 145 on/from the second portion 25.

The cartridge 30 may be removably detachable from the housing 15 through the open-ended second portion 25 by way of opening the end cap 145 of the housing 15. In this regard, the cartridge 30 may be reloaded into the second portion 25 by opening the end cap 145 and inserting the cartridge 30 into the second portion 25 of the housing 15. Once the cartridge 30 is seated in the second portion 25 of the housing 15, the end cap 145 may be pushed/placed, etc. on the second portion 25 of the housing 15 to close the second portion 25 of the housing 15.

While the second motor 70 may be positioned in any of the first portion 20, the second portion 25, and the end cap 145 of the housing 15, in the examples shown in FIGS. 4(A) through 4(H), the second motor 70 is positioned in the front portion 20 of the housing 15 and adjacent to the first motor 65 and attached to the front wall 62. The second pinion 110 operatively connected to the second motor 70 aligns and engages the second gear 105. As described above, upon actuation of the second motor 70, the second pinion 110 actuates, causing the second gear 105 to actuate, causing the rod 55 to actuate, causing the plate 60 to translate, causing the lubricant 35 to be pushed by the plate 60 in the cartridge 30 and through the egress port 31 and into the nozzle 50, and out onto the head 40.

The device 5*d* may further comprise a power source 115 in the handle 10, and an electronic circuit board 120 in the handle 10 that is electrically connected to the display screen 18, power source 115, the first motor 65, and the second motor 70. In an example, the electrical connection between the electronic circuit board 120 in the handle 10 to the first motor 65 and the second motor 70 may occur through the rotational member 16 that attaches the handle 10 to the housing 15. In the housing 15, electrical traces/wires 101 may be appropriately arranged to provide electrical connections to the first motor 65 and the second motor 70. In another example, the first motor 65 and the second motor 70 may each comprise RFID components (e.g., one or more sensors 44 . . . 44*x*) to provide wireless communication 102 with the electronic circuit board 120. In an example, the power source 115 may be a DC electric power source, although other types of power sources are possible in accordance with the embodiments herein. The power source 115 may comprise one or more batteries, which may be disposable and/or rechargeable. Furthermore, the power source 115 may comprise multiple cells of lithium-ion batteries, such as 18650 Li-ion batteries, according to an example.

In some examples, as shown in FIG. 6, the electronic circuit board 120 may comprise a microchip 36 and transceiver 37 among other microelectronic and/or circuit board components 38 . . . 38*x* (e.g., memory, other processors, etc.). The power source 115 is connected to the electronic circuit board 120 and the display screen 18. The transceiver 37 permits wired and/or wireless communication 103 to a remote device 200 that is communicatively coupled to the device 5*d*. In some examples, the remote device 200 may comprise any of a smartphone, tablet device, laptop, computer, server, or any other electronic communication device including smart appliances such as a television, smart speaker, or electronic virtual assistant devices. The buttons 19 of the display screen 18 and/or of the handle 10 and/or the remote device 200 may be used to transmit instructions through the microchip 36 of the electronic circuit board 120 for operation of the device 5*d* including actuation of the first motor 65 and second motor 70.

According to an example, the egress port 31 may be configured to actuate between an opened position (to allow the lubricant to dispense from the cartridge 30) and closed position (to retain the lubricant 35 in the cartridge 30). In an example, the egress port 31 may be electrically connected (wired and/or wireless) to the microchip 36 to receive actuation instructions based on user input and/or programmable instructions stored in the microchip 36. For example, the actuation instructions may include opening the egress port 31 to permit the lubricant 35 to exit the cartridge 30 and on to the nozzle 50. In another example, the actuation instructions may include closing the egress port 31 to prevent the lubricant 35 from exiting the cartridge 30. In still another example, the actuation instructions may be based on data collected by one or more sensors 44 . . . 44*x* positioned in the device 5*a*, 5*b*, 5*c*, 5*d*, such as positioned adjacent to or in the handle 10, cartridge 30, the egress port 31, head 40, first portion 20, second portion 25, third portion 135, first motor 65, second motor 70, or elsewhere in or on the device 5*a*, 5*b*, 5*c*, 5*d* such that the collected data may relate to environmental conditions and operational parameters (e.g., temperature, humidity, duration of use, etc.) experienced by the device 5*a*, 5*b*, 5*c*, 5*d*, as well as the status and condition of the components and structures in the device 5*a*, 5*b*, 5*c*, 5*d*, and further including the condition of the lubricant 35 such as the temperature, viscosity, and duration in the cartridge 30, etc. Accordingly, a predetermined set of parameters may be stored in the memory (e.g., components 38 . . . 38*x*) and accessed by the microchip 36 or stored in the remote device 200 and compared with the collected data from the one or more sensors 44 . . . 44*x* to determine whether the device 5*a*, 5*b*, 5*c*, 5*d* should be used or turned off for further investigation (e.g., replacement of the cartridge 30 or cleaning and/or repair of the device 5*a*, 5*b*, 50, 5*d*, etc.). Furthermore, in another example, the egress port 31 may be a hole without the ability to close. However, the data from the one or more sensors 44 . . . 44*x* may indicate whether the lubricant 35 should be used and if the lubricant 35 should not be used or if there is not sufficient lubricant 35 in the cartridge 30, then the one or more sensors 44 . . . 44*x* may transmit an electric signal to the microchip 36 to prevent the second motor 70 from turning on, thereby preventing the rod 55 to actuate and the plate 60 to move, which will prevent the lubricant 35, if any, from being released from the cartridge 30 to the nozzle 50. In another example, the remote device 200 may control all operations of the device 5*a*, 5*b*, 5*c*, 5*d*.

In the configurations of devices 5*a*, 5*c*, the second motor 70, the second gear 105, and the second pinion 110 are all positioned in the third portion 135 of the housing 15 and behind the cartridge 30. Conversely, in the configurations of devices 5*b*, 5*d*, the second motor 70, the second gear 105, and the second pinion 110 are all positioned in the first portion 20 of the housing 15 and in front of the cartridge 30. Irrespective of the configuration, the second motor 70, the second gear 105, and the second pinion 110 are collectively used to drive the motion of the rod 55 for actuation of the plate 60 to push the lubricant 35 from the cartridge 30 into the nozzle 50. In all of the configurations of devices 5*a*, 5*b*, 5*c*, 5*d*, the first motor 65, the first gear 95, and the first pinion 100 are all positioned in the first portion 20 of the housing 15 such that the first motor 65, the first gear 95, and the first pinion 100 are collectively used to drive the motion of the head 40. In some examples, the length of the housing 15 including the head 40 is shorter in the configuration of devices 5*b*, 5*d* compared with the configuration of devices 5*a*, 5*c*. However, in other examples, the respective lengths of the housing 15 for all devices 5*a*, 5*b*, 5*c*, 5*d* are substantially the same, and the embodiments herein are not restricted to any particular length.

Once again with reference to FIG. 6, in an example, the power source 115 may be located at any suitable position in the handle 10. Furthermore, the device 5*a*, 5*b*, 5*c*, 5*d* may comprise a stable physical charging/data port (e.g., docking station 150) in case wireless connections are inoperable. Moreover, the device 5*a*, 5*b*, 5*c*, 5*d* comprises an audio speaker 27 to output instructions or other audio cues to the user. The audio speaker 27 may be positioned at any suitable location on the handle 10. Additionally, the handle 10 may comprise a microphone 28 to receive audio input from a user. In another example, the microchip 36 may have voice recognition software programmed therein for receiving audio instructions from the remote device 200.

From the patient perspective, the display screen 18 may be the control mechanism for a direct applicator of different cream products. For more sophisticated functions, the display screen 18 may also serve a role to interface with the platform software app, which may provide more specific and complex functions for operating the device 5*a*, 5*b*, 5*c*, 5*d*.

The device 5*a*, 5*b*, 5*c*, 5*d* provided by the embodiments herein achieves effectiveness in its use and operation in several ways. From an impact perspective, the device 5*a*, 5*b*, 5*c*, 5*d* provides efficacy, clinical value, reduced time, reduced effort in use, increased ease of use, faster healing of user, and quick recovery of user. In this regard, the device 5*a*, 5*b*, 5*c*, 5*d* provides effectiveness of use from different perspectives such as the patient/user perspectives and the physician/therapist/aesthetician/pharmacist perspectives. The effectiveness from a patient's perspective means that the lubricant 35 (i.e., drug or cream, etc.) being dispensed by the device 5*a*, 5*b*, 5*c*, 5*d* may be easily and evenly absorbed by the user's skin, and the device 5*a*, 5*b*, 50, 5*d* allows the lubricant 35 to be easily applied to various areas of the user without limitations of access. In this regard, the device 5*a*, 5*b*, 5*c*, 5*d* will make it easier to reach all areas of the user, and the lubricant 35 may be dispensed and applied on evenly resulting in a pleasant user experience.

The user/patient will also want the dispensing and application to not be messy, and the user/patient will also want the experience to be convenient and easy. The device 5*a*, 5*b*, 5*c*, 5*d* achieves these goals also by allowing the user to use less effort than it may take in opening a cold container and squeezing and rubbing and doing the work to evenly apply the medication with one's hands. Accordingly, the entire user experience is nicer from a patient's perspective by using the device 5*a*, 5*b*, 5*c*, 5*d* compared with the conventional techniques of using a user's hands directly to apply the lubricant 35.

From a clinician's perspective, the device 5*a*, 5*b*, 5*c*, 5*d* provides for better absorption of the lubricant 35 onto/into the user's skin. The goal is to have medication or active ingredients penetrate and to absorb better than if applied by hand. One aspect of using the device 5*a*, 5*b*, 5*c*, 5*d* is the repetitive friction and occlusion that may come from a device 5*a*, 5*b*, 5*c*, 5*d* that provides rotational or buffing action during application of the lubricant 35 onto the user's skin. It is highly likely that the repetitive and varying modes of pressure and rotation from the device 5*a*, 5*b*, 5*c*, 5*d* may cause the lubricant 35 to have much better penetration into the user's skin. There are many studies that show the benefits of simple occlusion or simple pressure at with a cream or formulation and how much more absorption takes place. There is no doubt that from a clinical perspective the added benefits of more vigorous rubbing may be more effective treatment because the active ingredients may better penetrate. However, because the device 5*a*, 5*b*, 5*c*, 5*d* utilizes an even application of the lubricant 35 the user does not experience uneven application and thus will not suffer from any deleterious effects of the buffing action.

From a precision perspective, the device 5*a*, 5*b*, 5*c*, 5*d* provides several characteristics when used including quantifiable, verifiable, and improved dosing, as well as repeatable, titratable, and application of accurate regimens, and for the dispensing and application of specific formulations. Patients appreciate the benefit of precision when knowing that the lubricant 35 being dispensed by the device 5*a*, 5*b*, 5*c*, 5*d* may be dosed the same, that there is a security in having the same amount being used as is recommended by either a professional, or an instructor, or a trusted source such as a close friend who obtained excellent results and benefits. Knowing that the dose is going to be the same is very helpful. In addition, because of precision in the dispensing of the lubricant 35 by the device 5*a*, 5*b*, 5*c*, 5*d* there is less waste of the lubricant 35. In this regard, less lubricant 35 is wasted because the user's fingers are not directly involved in applying the lubricant 35 to the skin, and there is less lubricant 35 being wasted on applicator sponges, bristles, abrasive particles, and/or brushes.

Precision may also play a role in how much friction is needed. For example, if the patient is told to keep the device 5*a*, 5*b*, 5*c*, 5*d* held against the skin for a specified period of time, that may essentially guarantee that the patient receives a precise friction and pressure delivered to the area along with the correct dose. This method may allow for the uniform absorption of the lubricant 35 being dispensed by the device 5*a*, 5*b*, 5*c*, 5*d*. In another example, the device 5*a*, 5*b*, 5*c*, 5*d* may include pressure sensitive sensors (e.g., one or more sensors 44 . . . 44*x*) in the head 40 that conveys pressure measurements back to the microchip 36 of the device 5*a*, 5*b*, 5*c*, 5*d*, which can be output to the patient, i.e., through the display screen 18 or other output mechanism indicating exactly how much pressure was applied for a specific area.

Precision is also an important element in aesthetics and cosmetics. By uniformly applying any kind of aesthetic product or treatment, the user will have a nicer and more evenly visual application. This is particularly useful for products such as sunscreens and foundations. In this regard, using the lubricant 35 being dispensed by the device 5*a*, 5*b*, 5*c*, 5*d* in a very uniform way is very important to the appearance of how the skin looks when the application is complete.

Clinicians who are treating patients may also appreciate that precision is a big factor in how their product or treatment was used. From a clinical perspective, knowing that a specific dosing regimen creates a specific outcome for the patient helps the clinician make a proper prediction for future patients on what dosing to recommend. By also receiving precise feedback on exactly how many treatments were completed, the clinician has a better sense of how their treatment performed. They can thereby adjust the dosing regimen for that patient or other patients based on this feedback, change the treatment strength, adjust the total treatment length, titration, as well as identify periods of avoiding treatment.

From a data perspective, the device 5*a*, 5*b*, 5*c*, 5*d* provides for communication, social networking, user feedback on treatment sessions, social sharing of treatment regimes, teaching, establishing communities of healing and care, and offering encouragement to other users. The embodiments herein provide a device 5*a*, 5*b*, 5*c*, 5*d* that fully takes advantage of the Internet of things (IoT). The treatment data, treatments, products, settings with the head 40, pressure measurements, patient feedback, etc. may be available during a review of what took place during use of the device 5*a*, 5*b*, 5*c*, 5*d*. This data may be available via a software app that collects the data from the device 5*a*, 5*b*, 5*c*, 5*d* and presents it via a web interface or software app interface on the remote device 200.

From the patient's perspective of having his/her data at their fingertips, this data can then be shared and brought to a platform where users can opt to recommend particular regimens and state what appeared to be a good number of rotations, sessions, times, and modifications of use, etc. The software app may be able to allow influencers or active users to share their favorite regimens with their friends and colleagues. By doing this, the device 5*a*, 5*b*, 5*c*, 5*d* provided by the embodiments herein allows users to be part of a unique community that can encourage one another in their success in using the device 5*a*, 5*b*, 5*c*, 5*d* and the positive results achieved therein. In this regard, the device 5*a*, 5*b*, 5*c*, 5*d* may motivate friends in enhancing aesthetics, beauty, and skin care.

Social media influencers or aesthetics experts have taken to social platforms to showcase their special interest and expertise in how they like to perform certain aesthetic treatments or make up regimens. In this regard, having a device 5*a*, 5*b*, 5*c*, 5*d* that gives them something that will show actual data to highlight with their videos and posts is a very powerful tool that many individuals may really appreciate. The device 5*a*, 5*b*, 5*c*, 5*d* provided by the embodiments herein may be able to permit users to share their data to social media platforms that can again be digested from a user perspective with regards to charts or specific graphs or trends showing improvement in the user's skin, etc.

As users engage the device 5*a*, 5*b*, 5*c*, 5*d*, they may be able to enter data directly to the device 5*a*, 5*b*, 5*c*, 5*d* when a treatment has begun and ended or indicate their recommendations for how the treatment went. This data may be aggregated onto the microchip 36 of the device 5*a*, 5*b*, 5*c*, 5*d* and/or a software app that may then be shared or uploaded to social media platform(s) or other database(s), etc. The database(s) may be local or remote to the device 5*a*, 5*b*, 5*c*, 5*d*.

Regimens that are prescribed by an aesthetician or provider may be displayed on the software app accessible on the remote device 200 or the display screen 18 on the device 5*a*, 5*b*, 5*c*, 5*d* and can be tracked by the overall system managing the device 5*a*, 5*b*, 5*c*, 5*d* in the form of metadata associated with the user and any RFID tags (e.g., one or more sensors 44 . . . 44*x*) on the device 5*a*, 5*b*, 5*c*, 5*d* and/or cartridge 30. When a different cartridge 30 with a separate regimen is installed, that particular regimen may be indicated as such on the display screen 18. Moreover, there may be a mechanism via the software app or display screen 18 to edit usage details when a particular treatment is performed. The information can also be made available via software app reminders for the user to remember to perform their treatment application. The device 5*a*, 5*b*, 5*c*, 5*d* provided by the embodiments herein can thereby serve as a compliance tool, integrating with existing reminder technology such as electronic calendars, alerts, and alarms, etc.

From a physician or clinician standpoint, having access to compliance data for topical treatments is a unique aspect provided by the embodiments herein. If the data is easily aggregated in a chart, graph, or numeric form, and uploaded in the form of a report so that these healthcare professionals can review the same on their electronic medical record (EMR) systems, they will see how the patient has been doing over a set time with specific treatments. These professionals can then adjust treatment regimens appropriately for the patient, as necessary. For example, the report may be similar to a PDF file received from a lab company that is integrated into an EMR system that may be developed for the device 5*a*, 5*b*, 5*c*, 5*d* provided by the embodiments herein. For example, a 30-day period of patient treatment, frequency, amount of usage, type of product, presented in the form of a graph or data that is easily interpreted at a glance with minimal guesswork may be beneficial from a clinical perspective, and as such the embodiments herein provide a unique solution for this environment.

For patients and physicians who participate, a communication bridge may be provided between their EMR system and the software app data provided by the embodiments herein, with authentication and bidirectional data exchange. Physicians who choose to actively treat patients with the device 5*a*, 5*b*, 5*c*, 5*d* in their offices, may have first access rights in this data exchange, and may also be able to participate in using prescription products that may be used with the device 5*a*, 5*b*, 5*c*, 5*d*. Pharmacies that specialize in filling custom applications or prescriptions or compounds for the lubricants 35 used in the device 5*a*, 5*b*, 50, 5*d* may also benefit from data collected from patient usage patterns.

From a platform perspective, the sales of product or medication, promotions, coordination between users, future product availability, supplies and recycling, product software updates, mobile platform Integration may all be aspects provided by the embodiments herein. For example, the platform for managing the device 5*a*, 5*b*, 5*c*, 5*d* may allow customers to purchase product, receive software updates, and improve the actual motion or usage of their device 5*a*, 5*b*, 5*c*, 5*d*. In this regard, patients may be able to purchase product tips, receive discounts for bulk usage, be able to send back used cartridges 30 for refills, and coordinate with messages between their pharmacies or physician offices that are using the platform to help guide their treatment or receive prescription medications.

The device 5*a*, 5*b*, 50, 5*d* may have robust programming and chip interfaces with the microchip 36 that may allow the motors 65, 70 to be reprogrammed via the app. The motors 65, 70 may be allowed to be reprogrammed as needed to accommodate a particular usage of the device 5*a*, 5*b*, 5*c*, 5*d*. Additionally, there may be Bluetooth® communication or other type of communication interface between a software app and the device 5*a*, 5*b*, 5*c*, 5*d*. Product updates may occur in the background when the remote device 200 such as a smartphone, tablet, computer, or other communicatively linked electronic device is within a communicatively linked distance from the device 5*a*, 5*b*, 50, 5*d*. The customer information and prior treatments, applications, purchased products, and entire usage history may be available for the patient to receive further discounts or to build an ongoing relationship with the user. The software app may have its own online product store that may easily allow the patient to purchase directly from the app and may permit purchase of product refills or specific cartridges 30 of new product by performing the purchases through the display screen 18 on the device 5*a*, 5*b*, 5*c*, 5*d* itself, for example.

The device 5*a*, 5*b*, 5*c*, 5*d* may be dimensioned and configured to easily fit in hand of a user. In an example, the device 5*a*, 5*b*, 5*c*, 5*d* may be dimensioned and configured to allow the user to be able to see his/her face on the display screen 18 and/or on the remote device 200 when being used on the face as the lubricant 35 is being dispensed by the device 5*a*, 5*b*, 5*c*, 5*d*, and to also reach around to all surfaces of the face with the dominant hand holding the device 5*a*, 5*b*, 5*c*, 5*d*. In an example, this may utilize an approximately 40-45° angle of use (although other angles are possible), similar to most existing face motorized razors, and makeup and aesthetic devices. Having the size of the device 5*a*, 5*b*, 5*c*, 5*d* be easily held in the hand, and at an angle may also optimize the usage of the device 5*a*, 5*b*, 5*c*, 5*d* as it is used to apply to all parts of the torso, arms and legs, hands and feet, etc. In an example, the width of the device 5*a*, 5*b*, 5*c*, 5*d*, including the cartridge 30, may be between 30-45 mm (although other sizes are possible) and may accommodate approximately 70 mL of lubricant 35 (although other sizes are possible), and the handle 10 may contain a straight or generally curved shape that may allow for ease in gripping the device 5*a*, 5*b*, 5*c*, 5*d* depending on the mode or location of application. Furthermore, in order for the device 5*a*, 5*b*, 5*c*, 5*d* to be precise in its application of the lubricant 35, the areas where the device 5*a*, 5*b*, 5*c*, 5*d* may be slippery due to the dispensing of the lubricant 35 may be textured or may contain a surface that will allow the user to grip the device 5*a*, 5*b*, 5*c*, 5*d* in a way to precisely apply product. The overall shape and configuration of the device 5*a*, 5*b*, 5*c*, 5*d* may be able to accommodate whatever components are required to transmit electronic data, and also provide the display screen 18 that will not interfere with the grip of the device 5*a*, 5*b*, 5*c*, 5*d*.

The variable control buttons 19 on handle 10 or as GUIs on the display screen 18 can be accessed by the fingers of a user or stylus, for example. By the user holding the device 5*a*, 5*b*, 50, 5*d* in a dominant hand, the user's thumb may be used to enter specific settings or usage on the display screen 18. Apart from a separate on/off button, the display screen 18 may be used to select device 5*a*, 5*b*, 5*c*, 5*d* settings, such as the speed and intensity of the treatment. The display screen 18 may also indicate specific data about what product is being used and what specific regimen to follow.

The device 5*a*, 5*b*, 5*c*, 5*d* is configured to be waterproof and structurally stable with rigid materials being used to keep the device 5*a*, 5*b*, 5*c*, 5*d* from being damaged when dropped or protecting the cartridge 30 or the electrical components (e.g., microchip 36 and batteries 38, etc.) and motors 65, 70.

The device 5*a*, 5*b*, 5*c*, 5*d* is configured to have local memory (e.g., components 38 . . . 38*x*) to ensure there is no loss of historical data regarding the treatments that have occurred in case the connection between a communicatively linked remote device 200 such as a smartphone, tablet, computer, or other electronic device and the device 5*a*, 5*b*, 5*c*, 5*d* is inoperable. Furthermore, the device 5*a*, 5*b*, 5*c*, 5*d* is configured for both wireless and wired connection with the communicatively linked remote device 200 such as a smartphone, tablet, computer, or other electronic device.

In addition to displays output by the display screen 18, an audible alert may be output from the speaker 27 to provide instructions or cues to the user on how to use the device 5*a*, 5*b*, 5*c*, 5*d*. For example, audible beeps may be output that may change in tone, volume, and/or frequency when it is time for the patient to move the device 5*a*, 5*b*, 5*c*, 5*d* across the patient's treatment area, such as the face. In this regard, outputs from the display screen 18 may be in sync with any audible mechanisms output by the speaker 27 in order to effectively communicate with the user.

In an example, the display screen 18 may have touch screen functionalities to allow the user to enter data directly onto the display screen 18; i.e., to manually input the amount of product used, duration of use, and/or to calibrate the device 5*a*, 5*b*, 50, 5*d*, etc. Furthermore, the use may also be able to start and end treatment sessions via the display screen 18.

The software app provided by the embodiments herein may be accessible on the user's remote device 200 (e.g., smartphone, tablet, computer, or other electronic devices such as a smart appliance, etc.). The software app may communicate regularly with the device 5*a*, 5*b*, 5*c*, 5*d*, and the display screen 18 and audio components help ensure that the device 5*a*, 5*b*, 5*c*, 5*d* provides feedback to the patient on whether any data upload has occurred, or device 5*a*, 5*b*, 5*c*, 5*d* updates have occurred, etc.

From a patient perspective, the configuration of the device 5*a*, 5*b*, 5*c*, 5*d* may allow the patient to hold the device 5*a*, 5*b*, 5*c*, 5*d* by the cartridge 30 and the main electrical components and structural components of the device 5*a*, 5*b*, 5*c*, 5*d* and the actual rotating portions of the device 5*a*, 5*b*, 5*c*, 5*d* may be at the tip (i.e., head 40) where the user will move and direct the device 5*a*, 5*b*, 5*c*, 5*d*. By keeping all of the rotating components, including the first motor 65 at the front end 2 of the device 5*a*, 5*b*, 5*c*, 5*d* closest to the skin, the device 5*a*, 5*b*, 5*c*, 5*d* may deliver any topical lubricant 35 with precision. The delivery of the lubricant 35 being dispensed by the device 5*a*, 5*b*, 5*c*, 5*d* from the main cartridge 30 may happen with the motors 65, 70 where torque is utilized for movement of the various components. By relying on two separate motors 65, 70 for the rotation and lubricant delivery functions, respectively, the device 5*a*, 5*b*, 5*c*, 5*d* achieves better precision of the exact amounts of medication or lubricant 35 that are dispensed, and with the precise motion delivered at the contact area (i.e., user's skin with the head 40).

The configuration of the device 5*a*, 5*b*, 5*c*, 5*d* allows the display screen 18 to be visible in the patient's palm when the device 5*a*, 5*b*, 5*c*, 5*d* is held away from the patient's face so that the patient can observe what the display screen 18 displays. Data related to the lubricant 35 being dispensed by the device 5*a*, 5*b*, 5*c*, 5*d* by the advancement second motor 70 and the rotation first motor 65 may be controlled by the microchip 36 that is electrically connected to the display screen 18. This configuration may allow for the microchip 36 to control both motors 65, 70 by sending wired and/or wireless signals to the display screen 18 and to both motors 65, 70, and to also send data via wireless signals such as Bluetooth® signals to a linked remote device 200 such as a smartphone, tablet, computer, or other electronic device that is communicatively linked to the device 5*a*, 5*b*, 5*c*, 5*d* through a software app. If the communicatively linked remote device 200 is not readily available, then data may be saved in memory (e.g., components 38 . . . 38*x*) in the device 5*a*, 5*b*, 5*c*, 5*d* until a communication link is established between the device 5*a*, 5*b*, 5*c*, 5*d* and the remote device 200. The overall dimension and configuration the handle 10 may be suitably shaped to accommodate a memory, cache, or data storage component in the handle 10 in case the device 5*a*, 5*b*, 5*c*, 5*d* is powered off or does not have the opportunity to update via the software app. In an example, the memory may be operatively connected to the microchip 36 and proximately positioned to the microchip 36.

In an example, the application head 40 may be magnetically attached to an underlying rotating platform that is operatively connected to the first motor 65. In an example, the center of the head 40 contains an opening for the nozzle

50 to allow for delivery of the lubricant 35 to the surface of the head 40. To have an effective patient treatment, the head 40 is suitably positioned on the device 5*a*, 5*b*, 5*c*, 5*d*. Depending on the location on the user being treated, the product/lubricant 35 type being used, and the intention of the final treatment outcome, there may be multiple head(s) 40 that may be switched during a particular treatment protocol. In this regard, there may be several head sizes and shapes. In an example, the head 40 may comprise different forms of silicone. In this regard, silicone may be shaped in many different forms and yield different hardness factors to achieve desired results. Furthermore, silicone may also be easily cleaned and disinfected after use. Other specific head types with more absorptive materials may be considered for aesthetic applications such as makeup and foundation use.

Additionally, larger heads 40 may also be used for body area cream application, and for specific disease types such as psoriasis and warts, which may require a more aggressive head for proper application. In this regard, the embodiments herein allow for versatility in head shape, size, and configuration, and design, which suitably matches the topical lubricant 35 for the correct type of application/treatment. In other examples, non-absorptive, smooth head surfaces 45 may allow for more precise amounts of lubricant 35 to be delivered. Clinicians may prefer this head type for medication applications. On the other hand, users may want precision to be in the uniformity of application, which may utilize absorptive surfaces for the head 40. Accordingly, the head 40 may have absorptive features to provide a very even and flawless look. In this case, preserving the precise amount of lubricant 35 may not be as important because efficacy is judged visually, not with the amount of lubricant 35 used, unlike in a strict medical application.

The head 40 may contain pressure sensors (e.g., one or more sensors 44 . . . 44*x*) to relay pressure information that may be helpful for calculating the exact amount of pressure delivered per treatment or per application for the patient. There may be data benefits to clinicians desiring to understand why some patients seem to have a different outcome compared to others. For example, the amount of pressure used when applying the lubricant 35 being dispensed by the device 5*a*, 5*b*, 5*c*, 5*d* may have a direct role in the effectiveness of the lubricant 35 being dispensed by the device 5*a*, 5*b*, 5*c*, 5*d*, and the head 40 may be able to deliver this information through the pressure sensors (e.g., one or more sensors 44 . . . 44*x*) to the microchip 36.

The software app, which may be run by the computer system 300 (of FIG. 7) may collect data on how long the head(s) 40 have been used or how frequently head(s) 40 have been used to determine if a new head 40 is recommended for optimal treatment. In this regard, if the head 40 is absorptive, then such a head 40 may only be recommended to be used a certain number of times before they are recommended to be replaced under safety guidelines from the United States Food and Drug Administration (FDA) or other government and/or industry authorities and entities. In this case, the collected data may include this data.

In an example, users may be able to purchase additional head(s) 40 through the device 5*a*, 5*b*, 5*c*, 5*d* itself (i.e., display screen 18 commands) or through a software app and/or through the Internet or through connection of the remote device 200. In addition, once pressure data is provided, this data can also be uploaded to reports that are generated for physician and other medical professional use.

The rotation first motor 65 may be a precision stepper motor or a DC motor, according to some examples. A step motor may provide for specific precision of rotation in that the step motor can be programmed for duration of use and rotation speed for specific products, and for specific regimens that may be developed for particular patients/uses. In addition, the first motor 65 may be waterproofed in case there is fluid exposure to electrical components of the first motor 65.

The ability to perform variable speed rotation that can be reversed and customized is another aspect of the device 5*a*, 5*b*, 5*c*, 5*d*. In this regard, the ability to customize what the lubricant 35 does, and what degree of rotation is provided, as well as the different application programs for the patient are also provided by the device 5*a*, 5*b*, 5*c*, 5*d* thereby increasing the overall effectiveness of treatment. With the use of RFID tags (e.g., one or more sensors 44 . . . 44*x*) from the cartridge 30 containing the lubricant 35 being dispensed by the device 5*a*, 5*b*, 5*c*, 5*d*, the microchip 36 controlling the first motor 65 will control exactly what type of rotation or rotation programs that may be necessary for effective application of lubricant 35. Additionally, the patient may be able to use pre-set programs that are available, or manual methods to manually set/control the rotation and speed of the first motor 65. Both the rotation first motor 65 and the dispensing second motor 70 may work in tandem or may function separately. Moreover, both motors 65, 70 may be controlled by the same microchip 36. This may allow the proper amount of lubricant 35 to be dispensed in the beginning of the application/treatment, during the middle of a more vigorous application/treatment, and at the very end of the application/treatment session. The first motor 65 may also have a separate sequence or series of sequences, that may be utilized when the device 5*a*, 5*b*, 5*c*, 5*d* is being charged, or when the device 5*a*, 5*b*, 5*c*, 5*d* may be going through cycles for cleaning the head 40. In addition, any added rotation programs that are created or updated may be uploaded to the microchip 36 for controlling the motors 65, 70.

In other examples, the total number of revolutions delivered by the first motor 65 per application may be calculated and recorded per session. For clinicians who are trying to determine how effective the treatment is, this metric may be useful for determining how effective the treatment sessions have been with the particular lubricant 35. The specific rotational speed provided by the first motor 65 for specific disease states may be more important or less important, accordingly. For example, rosacea or sensitive skin conditions may require a different stroke pattern than conditions where the skin is very thick such as chronic psoriasis. Having pre-set settings that reduce the number of rotations or allow a rest between rotations may be used for such scenarios. Moreover, there may be simple settings for non-sophisticated users as well as more customizable and/or programmable settings for patients that are prescribed a specific regimen. For a clinical scientist that are in a specific product study for the lubricant 35, delivering a set number of strokes or rotation may be necessary to demonstrate that the lubricant 35 has been used uniformly by different patients to ensure repeat ability for a scientific study. Accordingly, the embodiments herein help achieve this.

The data from treatment sessions regarding number of strokes, rotations, duration of treatment for each lubricant/product, etc. may be synced back to the main software app platform via Bluetooth® connection or other data transfer protocol. As indicated above, the data may also be stored locally on the device 5*a*, 5*b*, 5*c*, 5*d* in memory (e.g., components 38 . . . 38*x*) in case of disruptions to the data transfer protocols. Again, reports can be generated from this data for patient use, physician clinician use, and/or research use. Additionally, the microchip 36 may support software updates for the motors 65, 70 through Bluetooth® connection or other data transfer protocol to the device 5*a*, 5*b*, 5*c*, 5*d*.

While the embodiments herein reduce lubricant 35 wastage, in an example, there may be some differences in the amount of lubricant 35 being dispensed and the amount that is desired to be dispensed. For this reason, the user may manually update the software app with the amount of lubricant 35 in the cartridge 30. In this regard, the user may input the amount of lubricant 35 into a display or into the software app to calibrate the device 5*a*, 5*b*, 5*c*, 5*d* so it accurately captures the amount of lubricant 35 left in the lubricant 35 being dispensed by the cartridge 30.

The product advancement second motor 70 may have a high torque and precise motion threshold. To effectively turn the rod 55, the lubricant 35 may be stiff and cold and may require strong movement by the plate 60. To facilitate this, the second motor 70 may be a stepper motor. The second motor 70 may be communicatively linked to the microchip 36, which may communicate to the software app the amount of lubricant 35 being used. Additionally, in an example, the second motor 70 may operate in tandem with the rotation first motor 65 as previously described. The microchip 36 may act as a controller to record the amount of lubricant 35 that is used, and this data may be based on the number of advancements performed by the second motor 70, as detected by the microchip 36. In another example, the cartridge 30 and/or second portion 25 of the housing 15 may comprise a heating element (not shown) to warm the lubricant 35.

The amount of product (i.e., drug/lubricant 35) released may be collected in the form of data that can be shared for the treatment session. The data may be stored locally in the device 5*a*, 5*b*, 50, 5*d* if communication protocols such as Bluetooth® protocols are unavailable, and when Bluetooth® protocol or other data transfer connections become available, the device 5*a*, 5*b*, 5*c*, 5*d* may sync with the remote device 200 and may be further upload to the communicatively linked software app, whereby the data may then be stored remotely; i.e., in the cloud, etc. The amount of lubricant 35 can then be sent to the EMR systems of a monitoring physician or pharmacy. The software platform provided by the embodiments herein may provide the patient the amount of lubricant 35 that they have used over time. This will allow the software platform provided by the embodiments herein to recommend refills of lubricant 35, as necessary.

Figure 7:
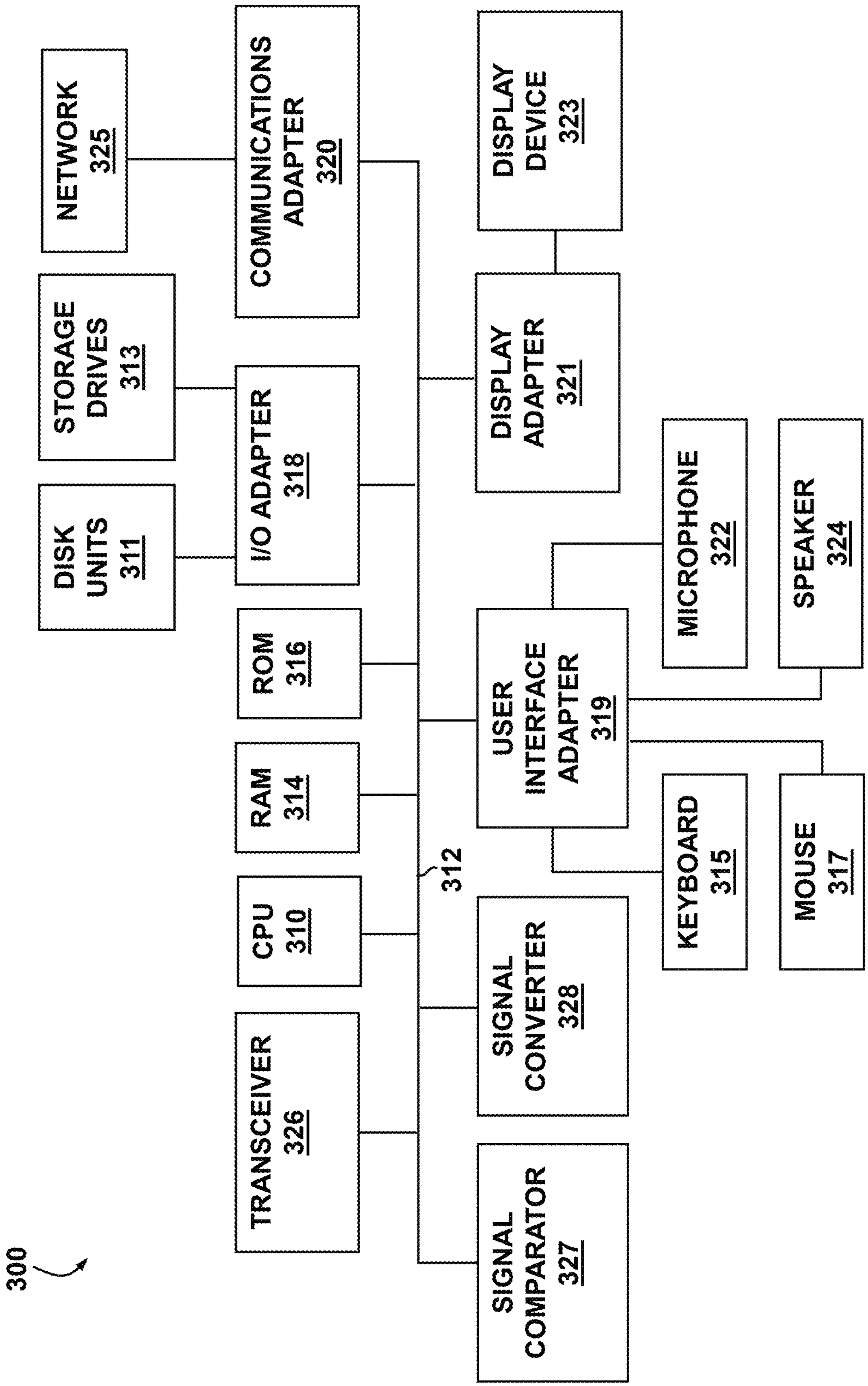
FIG. 7 is a block diagram of a computer system for running a software app, according to an embodiment herein.

The software app may be run on a computer system 300 as shown in FIG. 7. The user may have all of their information relating to the device 5*a*, 5*b*, 5*c*, 5*d* on the mobile software app or on the device 5*a*, 5*b*, 5*c*, 5*d* provided by the embodiments herein or on a website onto which the user may register user-specific information for a customizable experience. Once the device 5*a*, 5*b*, 5*c*, 5*d* is initially linked via a wired or wireless connection to a remote device 200, etc., the device 5*a*, 5*b*, 5*c*, 5*d* may be activated to operate. Thereafter, all treatments performed with the device 5*a*, 5*b*, 5*c*, 5*d* and with any product cartridge 30 may be recorded on the software app and thereby onto the device 5*a*, 5*b*, 50, 5*d* or other electronic device associated with the user. Reports on device 5*a*, 5*b*, 5*c*, 5*d* activity may be available to the user via a web portal or the software app portal on their respective remote device 200 at any time. Typical username access and other functions may be maintained by the website and/or database administrators, for example. The website and software app may have videos or other instructions to show the user how to use the device 5*a*, 5*b*, 50, 5*d*. Moreover, the software app may recommend products to the user depending on their need, skin type, and/or desire for treatment of specific conditions.

For medically oriented users or users receiving the device 5*a*, 5*b*, 5*c*, 5*d* from a health professional, the availability to be prescribed pharmaceutical grade, compounded products may be made through specialty pharmacies. A provider portal may be available for physicians who wanted to interface with patient data and collect metrics on the usage of products that were specifically prescribed. A pharmacy portal may also be developed to obtain the same information so that the specialty pharmacy may know exactly how much lubricant 35 was being used, and whether a refill may be needed soon. Such portal communications may occur through the software app, according to an example.

The software app or the web application may allow the patient/user to order refills, be recommended new lubricants or products, order shipping containers to recycle used cartridges 30, etc. Furthermore, the software app may also allow for video uploads for favorite methods of application of specific products, etc., and may also allow users to share profiles and regimens to highlight their favorite ways of using the device 5*a*, 5*b*, 50, 5*d* and the lubricant 35 being dispensed by the device 5*a*, 5*b*, 5*c*, 5*d* including success stories. Additionally, the software app may easily interface with existing social media apps. From a patient and clinician and pharmacist perspective, the web portal and software applications represent a unique opportunity to have a primary interface for the device 5*a*, 5*b*, 5*c*, 5*d* be strictly through the software application. In this regard, the device 5*a*, 5*b*, 50, 5*d* and software app may comprise heightened security measures to ensure data is not breached.

FIG. 7 is a block diagram of a computer system 300 for running a software app, according to an embodiment herein. Furthermore, the embodiments herein may also include tangible and/or non-transitory computer-readable storage media for carrying or having computer-executable instructions or data structures stored thereon to run the software app. Such non-transitory computer readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a special purpose computer or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types.

Computer-executable instructions, associated data structures, and program modules represent examples of the program code means for executing steps of the methods disclosed herein. The particular sequence of such executable instructions or associated data structures represents examples of corresponding acts for implementing the functions described in such steps.

A representative hardware environment for practicing the embodiments herein is depicted in FIG. 7. This schematic drawing illustrates a hardware configuration of an information handling/computer system 300 for running the software app in accordance with the embodiments herein. The system 300 comprises at least one processor or central processing unit (CPU) 310. The CPUs 310 are interconnected via system bus 312 to various devices such as a random-access memory (RAM) 314, read-only memory (ROM) 316, and an input/output (I/O) adapter 318. The I/O adapter 18 can connect to peripheral devices, such as disk units 311 and tape drives 313, or other program storage devices that are readable by the system. The system 300 can read the inventive instructions on the program storage devices and follow these instructions to execute the methodology of the embodiments herein. The system 300 further includes a user interface adapter 319 that connects a keyboard 315, mouse 317, speaker 324, microphone 322, and/or other user interface devices such as a touch screen device to the bus 312 to gather user input. Additionally, a communication adapter 320 connects the bus 312 to a data processing network, and a display adapter 321 connects the bus 312 to a display device 323 which may be embodied as an output device such as a monitor, printer, or transmitter, for example. Further, a transceiver 326, a signal comparator 327, and a signal converter 328 may be connected with the bus 312 for processing, transmission, receipt, comparison, and conversion of electronic signals.

The foregoing description of the specific embodiments will so fully reveal the general nature of the embodiments herein that others may, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein may be practiced with modification within the spirit and scope of the appended claims.

What is claimed is:

1. A device comprising:
an applicator head;
a processor;
a memory operatively connected to the processor; and
a pressure sensor in the applicator head, wherein the pressure sensor is to:
detect pressure measurements during a treatment session; and
transmit the pressure measurements to the processor;
wherein the memory is to store treatment session data including the pressure measurements and a treatment duration, and
wherein the processor is to:
analyze the pressure measurements to determine treatment effectiveness, and
generate treatment reports based on historical treatment session data.

2. The device of claim 1, wherein the processor is to:
monitor cumulative usage time of the applicator head;
compare the cumulative usage time to a predetermined maximum usage threshold; and
generate a replacement notification when the cumulative usage time exceeds the predetermined maximum usage threshold.

3. The device of claim 1, wherein the processor is to:
determine whether the pressure measurements are within a therapeutic pressure range; and
generate a notification when the pressure measurements are outside the therapeutic pressure range.

4. The device of claim 1, wherein the processor is to:
track frequency of treatment sessions;
compare an actual treatment frequency against prescribed treatment frequency; and
generate compliance reports based on the comparison.

5. The device of claim 1, wherein the memory is to store the treatment session data when a wireless connection is unavailable, and wherein the processor is to automatically transmit the stored treatment session data when a wireless connection is established.

6. The device of claim 1, comprising a cartridge containing a lubricant, wherein the treatment session data comprises timestamps for treatment start and end times, rotation speed of the applicator head, rotation duration, and an amount of lubricant dispensed.

7. The device of claim 1, wherein the processor is to:
analyze historical treatment session data;
identify treatment effectiveness patterns; and
generate recommended treatment parameters based on the identified patterns.

8. The device of claim 1, wherein the processor is to:
detect when absorptive properties of the applicator head have degraded based on treatment session data; and
generate a replacement notification.

9. The device of claim 1, wherein the processor is to:
track a total number of treatment sessions performed with the applicator head; and
control usage duration of the device based on regulatory guidelines or medical professional input, or a combination thereof.

10. The device of claim 1, comprising environmental sensors that detect ambient conditions during treatment sessions, wherein the processor is to analyze treatment effectiveness in relation to the ambient conditions.

11. The device of claim 1, wherein the processor is to:
detect treatment session interruptions;
log a duration of the detected treatment session interruptions; and
adjust treatment effectiveness calculations based on the detected treatment session interruptions.

12. The device of claim 1, wherein the processor is to:
detect changes in pressure application patterns of the applicator head over time; and
generate notifications when the detected pressure application patterns deviate from established baseline patterns.

13. A method of monitoring dermatologic treatment compliance comprising:
receiving treatment session data from a dermatologic treatment device, wherein the dermatologic treatment device comprises:
an applicator head;
a cartridge containing a lubricant; and a pressure sensor in the applicator head;

analyzing the treatment session data to determine:

a treatment session duration;

pressure measurements during the treatment session;

an amount of lubricant dispensed by the cartridge; and a frequency of performing treatment by the dermatologic treatment device; and comparing the analyzed treatment session data against established treatment parameters.

14. The method of claim 13, comprising:

generating treatment compliance reports based on the analyzed treatment session data; and transmitting the treatment compliance reports to a healthcare provider system.

15. The method of claim 13, comprising:

detecting non-compliance with prescribed treatment parameters; and generating alerts to a user, a healthcare provider, or a combination thereof based on detected non-compliance with the prescribed treatment parameters.

16. The method of claim 13, comprising:

integrating the treatment session data with an electronic medical record system; and providing secure access to the treatment session data to authorized healthcare providers.

17. The method of claim 13, comprising:

analyzing pressure patterns of the applicator head detected by the pressure sensor during the treatment session;

identifying optimal pressure ranges for treatment effectiveness; and providing pressure application guidance to a user.

18. The method of claim 13, comprising:

tracking lubricant usage rates;

predicting when additional lubricant will be needed based on the tracked lubricant usage rates; and automatically generating lubricant refill notifications.

19. The method of claim 13, comprising generating treatment session metrics including: average session duration, average pressure applied, total treatment time, and adherence to a prescribed treatment schedule.

20. The method of claim 13, comprising:

generating aggregate treatment effectiveness data based on data received from multiple users;

identifying optimal treatment parameters; and updating recommended treatment protocols based on the aggregate treatment effectiveness data.

21. A non-transitory program storage device readable by a computing device, and comprising a program of instructions executable by the computing device to perform a method of monitoring dermatologic treatment compliance, the method comprising:

receiving treatment session data from a dermatologic treatment device, wherein the dermatologic treatment device comprises:

an applicator head;

a cartridge containing a lubricant; and a pressure sensor in the applicator head;

analyzing the treatment session data to determine:

a duration of a treatment session;

pressure measurements of the applicator head detected by the pressure sensor during the treatment session;

an amount of lubricant dispensed from the cartridge; and a frequency of performing treatments; and comparing the analyzed treatment session data against predetermined treatment parameters.

* * * * *